US012722323B2

(12) United States Patent
Bellissimo et al.

(10) Patent No.: US 12,722,323 B2
(45) Date of Patent: Sep. 1, 2026

(54) STUD STRAIGHTENER SYSTEM AND METHOD OF STRAIGHTENING STUDS OF A WALL STRUCTURE FOR A MODULAR CONSTRUCTION UNIT

(71) Applicant: Buildz, LLC, Forest City, NC (US)

(72) Inventors: Mark Joseph Bellissimo, Wellington, FL (US); Stanley Clark Beard, Jr., Hendersonville, NC (US); Caleb Robert Boothe, Inman, SC (US); Robert James Hellner, Zirconia, NC (US)

(73) Assignee: Buildz, LLC, Forest City, NC (US)

( * ) Notice: Subject to any disclaimer, the term of this patent is extended or adjusted under 35 U.S.C. 154(b) by 0 days.

(21) Appl. No.: 19/016,913

(22) Filed: Jan. 10, 2025

(65) Prior Publication Data

US 2025/0229453 A1 Jul. 17, 2025

Related U.S. Application Data

(60) Provisional application No. 63/620,464, filed on Jan. 12, 2024.

(51) Int. Cl.
*B27M 3/00* (2006.01)
*E04B 2/70* (2006.01)

(52) U.S. Cl.
CPC ............. *B27M 3/0073* (2013.01); *E04B 2/70* (2013.01)

(58) Field of Classification Search
CPC ........... B27M 1/08; B27M 3/004; B27F 7/003
See application file for complete search history.

(56) References Cited

U.S. PATENT DOCUMENTS 3,680,617 A * 8/1972 Schneider ............ B27M 3/0013 269/910
5,787,676 A * 8/1998 Scharf ..................... E04F 21/22 52/DIG. 1
D450,992 S * 11/2001 Abshire ........................... D8/88
(Continued)

FOREIGN PATENT DOCUMENTS

EP 1055482 B1 7/2004
EP 1593472 A1 11/2005
(Continued)

OTHER PUBLICATIONS

International Search Report and Written Opinion directed to PCT/US2025/011144 mailed May 9, 2025.

*Primary Examiner* — Jason L Vaughan
(74) *Attorney, Agent, or Firm* — KDW FIRM PLLC

(57) ABSTRACT

A stud straightener system and method of straightening studs of a wall structure for a modular construction unit. The wall structure has a wall frame including the studs and one or more sheathing panels on a top side of the wall frame. The stud straightener system includes a wall frame conveyor and a stud straightener assembly. The wall frame conveyor is configured to move the wall structure thereon. The stud straightener assembly includes an actuator assembly having an actuator and a carriage tooling assembly having a clamp tooling assembly. The carriage tooling assembly is configured to move along the actuator to one or more of the studs and the clamp tooling assembly is configured to engage the one or more of the studs to straighten the one or more of the studs.

20 Claims, 22 Drawing Sheets

(56) References Cited

U.S. PATENT DOCUMENTS

| | | | | |
|---|---|---|---|---|
| 6,561,404 | B2 * | 5/2003 | Raffoni | B27M 1/08 227/100 |
| 2006/0096204 | A1 * | 5/2006 | Martens | E02D 27/02 52/293.3 |
| 2013/0283618 | A1 | 10/2013 | Wiliams | |
| 2024/0051178 | A1 * | 2/2024 | Bellissimo | E04C 3/17 |

FOREIGN PATENT DOCUMENTS

| | | | |
|---|---|---|---|
| FR | 2951975 | A1 | 5/2011 |
| WO | 2022/183037 | A1 | 9/2022 |

* cited by examiner

STUD STRAIGHTENER SYSTEM AND METHOD OF STRAIGHTENING STUDS OF A WALL STRUCTURE FOR A MODULAR CONSTRUCTION UNIT

CROSS REFERENCE TO RELATED APPLICATIONS

This application claims the benefit of U.S. Provisional Patent Application No. 63/620,464, filed on Jan. 12, 2024, the entire contents of which is hereby incorporated by reference in its entirety.

TECHNICAL FIELD

The present disclosure relates generally to construction of modular construction units. In particular, the present disclosure relates to a stud straightener system and a method of straightening studs of a wall structure for a modular construction unit.

BACKGROUND

The production of modular, or prefabricated, buildings is a growing industry. In this type of manufacturing, sections of a building or structure, also referred to as a modular construction unit, are partially assembled at a remote location, and the sections are then delivered to the final building site, where final construction of the structure is ultimately completed by assembling the various sections together. Such modular construction units can be used for a variety of purposes, including, for example, as temporary or permanent buildings, such as residential homes, commercial offices, educational or service facilities, etc. Wall structures of the modular construction unit have wall frames with studs that may need to be straightened prior to sheathing panels being fastened to the studs to form the wall structure.

SUMMARY

A stud straightener system for straightening studs of a wall structure for a modular construction unit, the stud straightener system comprising a wall frame conveyor configured to move the wall structure thereon, the wall structure having a wall frame comprising the studs and one or more sheathing panels on a top side of the wall frame, a stud straightener assembly comprising an actuator assembly having an actuator and a carriage tooling assembly having a clamp tooling assembly, wherein the carriage tooling assembly is configured to move along the actuator to one or more of the studs and the clamp tooling assembly is configured to engage the one or more of the studs to straighten the one or more of the studs.

A method of straightening studs of a wall structure for a modular construction unit, the method comprising moving the wall structure on a wall frame conveyor, the wall structure having a wall frame comprising the studs and one or more sheathing panels on a top side of the wall frame, moving a carriage tooling assembly of a stud straightener assembly along an actuator to one or more of the studs, and engaging the one or more of the studs with a clamp tooling assembly of the carriage tooling assembly to straighten the one or more of the studs.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
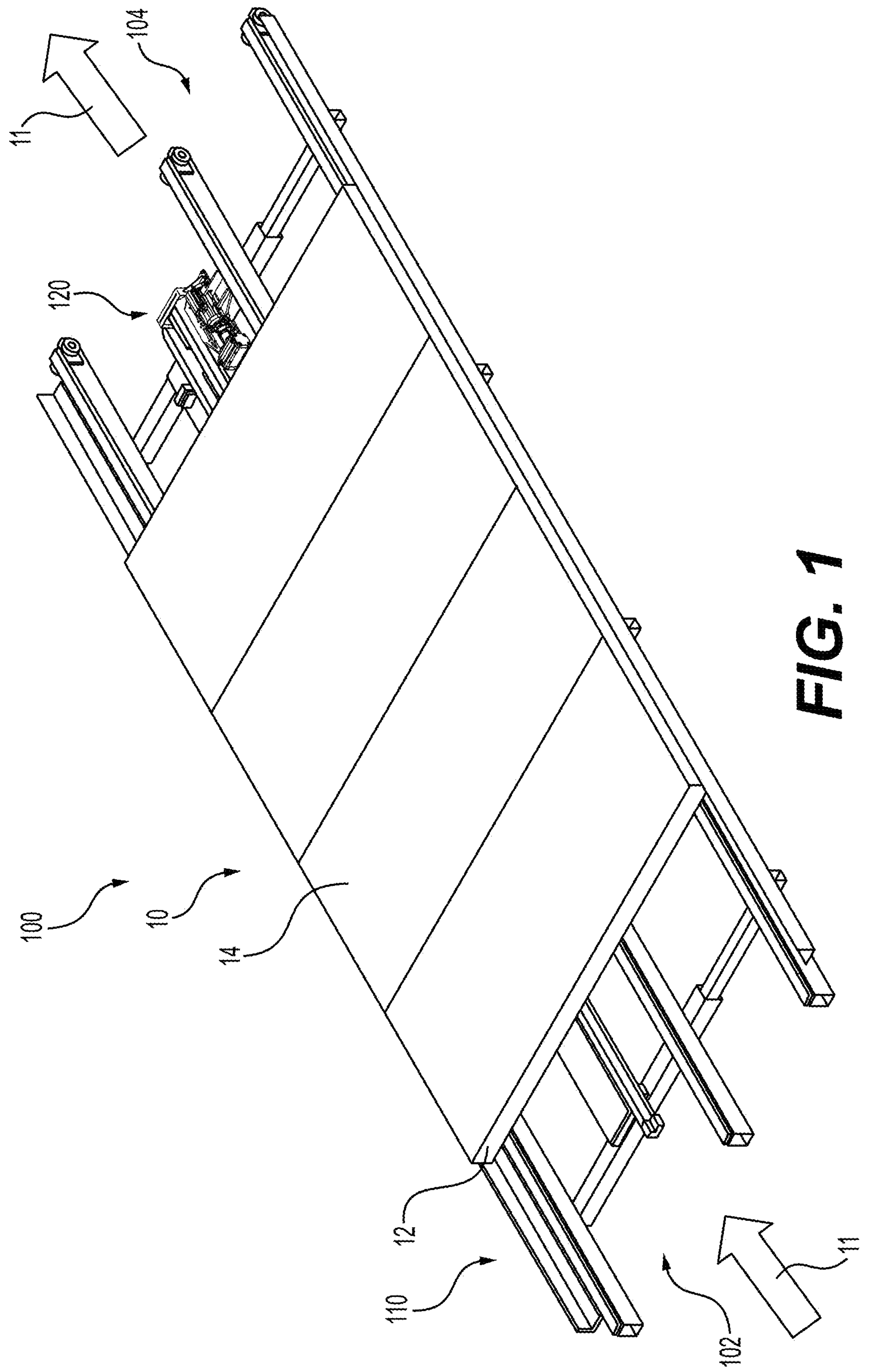
FIG. 1 is a perspective view of a stud straightener system for a wall structure for a modular construction unit having a wall frame and one or more sheathing panels on the wall frame, according to the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second,", "third," etc., may be used interchangeably to distinguish one component from another and are not intended to signify location or importance of the individual components.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

As mentioned above, the studs of the wall structure being formed for a modular construction unit may need to be straightened prior to the sheathing panels being fastened to the studs. In a system for automatically constructing the wall structures, a wall frame enters a sheathing fastening system on a wall frame conveyor with one or more sheathing panels on a top side of the wall frame. The sheathing panels are yet to be fastened to the wall frame and the studs are on the underside of the wall structure facing the ground. The sheathing fastening system is configured to fasten the sheathing panels to the wall frame by inserting fasteners (e.g., screws, nails, etc.) through the sheathing panels and through the studs, thereby creating the wall structure. When the wall frame enters the sheathing fastening system, the studs may be bowed or arced. If the studs are bowed or arced, the fasteners may be installed incorrectly, for example, near the edge of the stud. This may cause delamination of the wood, thereby weakening the stud structure and/or causing the stud to break. Further, studs at a seam require at least twice as many fasteners since the seam is where two sheathing panels are fastened to the same stud, and the fastener target is therefore smaller at the seams as compared to studs aligned in the middle of a sheathing panel. Thus, ensuring the studs are straight and centered is critical to ensure proper placement of the fasteners through the sheathing panels and the studs.

Accordingly, the present disclosure provides for a stud straightener system and a method of straightening studs of a wall structure for a modular construction unit. The stud straightener system includes a stud straightener assembly and a wall frame conveyor. The wall conveyor moves the wall structure, with the sheathing panels thereon, to a predetermined position on the wall frame conveyor. The stud straightener assembly moves anywhere along the length of the wall structure and center clamps at each stud. In some embodiments, the position of each stud is predetermined based on the location of the wall frame on the wall frame conveyor. In some embodiments, the stud straightener system can determine the location of the studs based on one or more sensors, for example, on the underside of the wall frame conveyor or on the stud straightener assembly. The stud straightener system includes a servo-driven actuator assembly that moves the stud straightener assembly and provides precise positional feedback of the stud straightener assembly location along the wall structure. In this way, the stud straightener assembly provides a static workpiece with dynamic tooling in that the stud straightener assembly can move anywhere along the length of the wall structure to each stud and can then straighten each stud.

The stud straightener assembly includes a clamp that closes and an actuator that moves the clamp to straighten each stud. In particular, the clamp is coupled to a rotary actuator that moves the clamp from a horizontal position to a vertical position. The clamp is moved to the horizontal position while the stud straightener assembly is moving along the wall structure to each stud. When the stud straightener assembly is at a particular stud, the rotary actuator moves the clamp to the vertical position so that the clamp can close onto the particular stud to engage the stud between two clamp members. The movement of the clamp from the horizontal position to the vertical position allows the clamp to be large for normal operation (e.g., to clamp onto a stud) while folding away to create a smaller volumetric envelope while the clamp is not in operation. The engagement of the clamp (between the two clamp members) on each side of the stud applies a load on the stud to straighten the stud. Once the stud is straight, fasteners are installed through the sheathing and into the stud below. In some embodiments, the stud straightener system straightens the studs and maintains the studs straight while the sheathing panels are fastened. In some embodiments, the stud straightener system straightens the studs prior to the sheathing panels being fastened. Thus, the stud straightener system ensures the studs are straight such that the fasteners are properly aligned with the studs when inserted through the sheathing panels and the studs. This helps to ensure that the studs do not delaminate when the fasteners are inserted therethrough.

Figure 2:
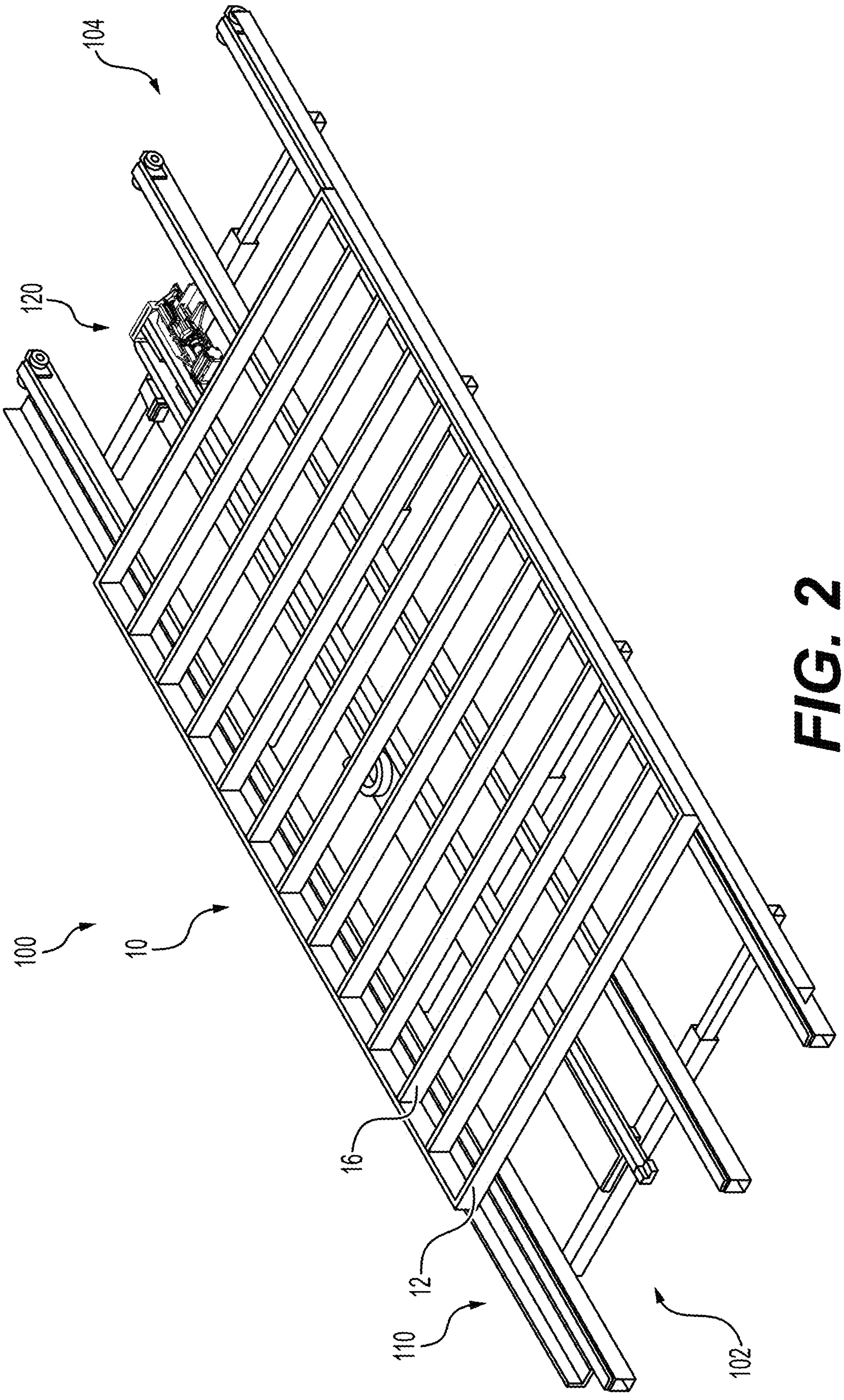
FIG. 2 is a perspective view of the stud straightener system for the wall structure with the sheathing panels removed and showing the wall frame, according to the present disclosure.

FIG. 1 is a perspective view of a stud straightener system 100 for straightening one or more studs 16 of a wall structure 10 for a modular construction unit having a wall frame 12 and one or more sheathing panels 14 on the wall frame 12, according to the present disclosure. FIG. 2 is a perspective view of the stud straightener system 100 for the wall structure 10 with the sheathing panels 14 removed and showing the wall frame 12, according to the present disclosure. The wall structure 10 can be constructed in a system for creating the wall structures 10 for use in creating a modular construction unit. The modular construction unit is, for example, a modular room that is built in a factory, transported in a substantially assembled state to a construction site, and secure to form a larger building, such as, for example, a hotel constructed from a plurality of such modular construction units. By way of example, the system for creating the wall structures 10 may be the system described in U.S. Patent Application Publication No. US2021/0187783, the contents of which are hereby incorporated by reference in their entirety. The stud straightener system 100 can be included as a part of a sheathing fastening system (e.g., the sheathing fastening station 620 of U.S. Patent Application Publication No. US2021/0187783) for straightening the one or more studs 16 (FIG. 2) of the wall frame 12 prior to, or while, the sheathing fastening system fastens the one or more sheathing panels 14 to the wall frame 12 with one or more fasteners. In this way, components of the stud straightener system 100 can encompass components of the sheathing fastening station (e.g., conveyors, tracks, cross-members, etc.).

As shown in FIG. 1, the stud straightener system 100 includes a first end 102, also referred to as a proximal end, and a second end 104, also referred to as a distal end. The stud straightener system 100 comprises a wall frame conveyor 110 and a stud straightener assembly 120. The wall frame conveyor 110 moves the wall structure 10 from the first end 102 towards the second end 104 (as indicated by arrows 11). The stud straightener assembly 120 is configured to move along the wall structure 10 and straighten one or more of the one or more studs 16 of the wall frame 12, as detailed further below.

Figure 3:
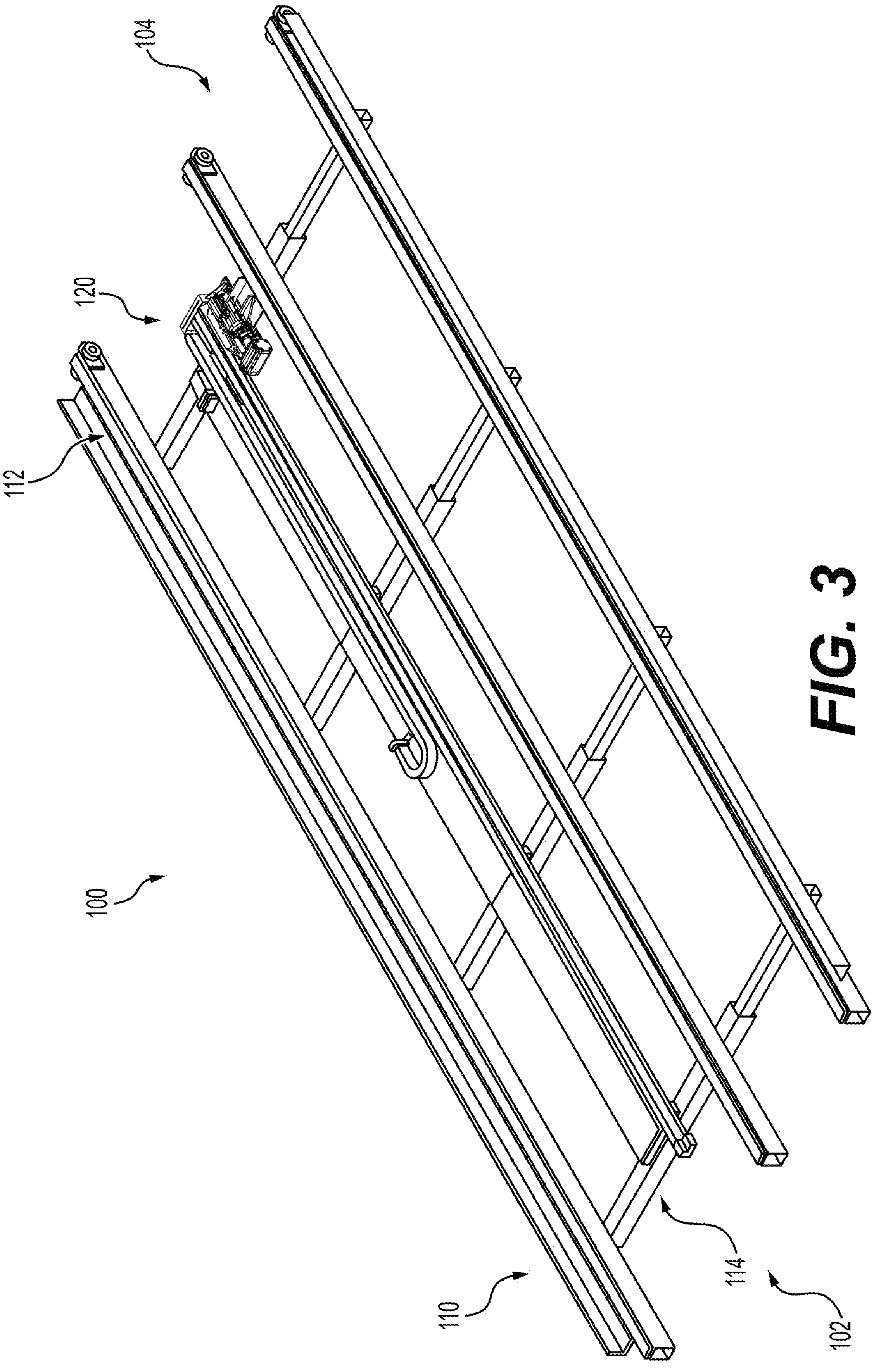
FIG. 3 is a perspective view of the stud straightener system with the wall structure removed, according to the present disclosure.

FIG. 3 is a perspective view of the stud straightener system 100 with the wall structure removed, according to the present disclosure. As shown in FIG. 3, the wall frame conveyor 110 includes a plurality of tracks 112 that extend longitudinally from the first end 102 to the second end 104. In this way, the wall frame conveyor 110 supports and transports a wall structure 10 (FIG. 1) with sheathing panels 14 (FIG. 1) to be fastened substantially permanently (e.g., generally being incapable of removal without destruction of the wall structure 10 and/or the sheathing panels 14 themselves). The plurality of tracks 112 can be segmented conveyors, belts, chains, or any other suitable device for supporting and transporting the wall structure 10 thereon. In some embodiments, only two tracks 112 may be provided. In the embodiment shown, there are three tracks 112 that are spaced apart from each other laterally (e.g., in a direction transverse to the direction of the longitudinal extension of the plurality of tracks 112).

The wall frame conveyor 110 also includes one or more cross-members 114. The plurality of tracks 112 are coupled to, and spaced apart on, the one or more cross-members 114. In this way, the plurality of tracks 112 are coupled to the one or more cross-members 114, and the one or more cross-members 114 support the plurality of tracks 112 thereon. The one or more cross-members 114 extend laterally (e.g., in a direction transverse to the longitudinal extension of the plurality of tracks 112. In the embodiment shown, there are four cross-members 114 spaced distally from the first end 102 to the second end 104.

The stud straightener assembly 120 extends longitudinally such that the stud straightener assembly 120 is substantially parallel with the plurality of tracks 112. The stud straightener assembly 120 is coupled to, and supported by, the one or more cross-members 114. In particular, the stud straightener assembly 120 is positioned on the one or more cross-members 114 and is disposed laterally between two of the tracks 112. In operation, components of the stud straightener assembly 120 move longitudinally between the first end 102 and the second end 104 along a length of the wall structure 10. The components of the stud straightener assembly 120 move to be centered at each of the studs 16, and the stud straightener assembly 120 engages a respective stud 16 to straighten the respective stud 16, as detailed further below.

Figure 4:
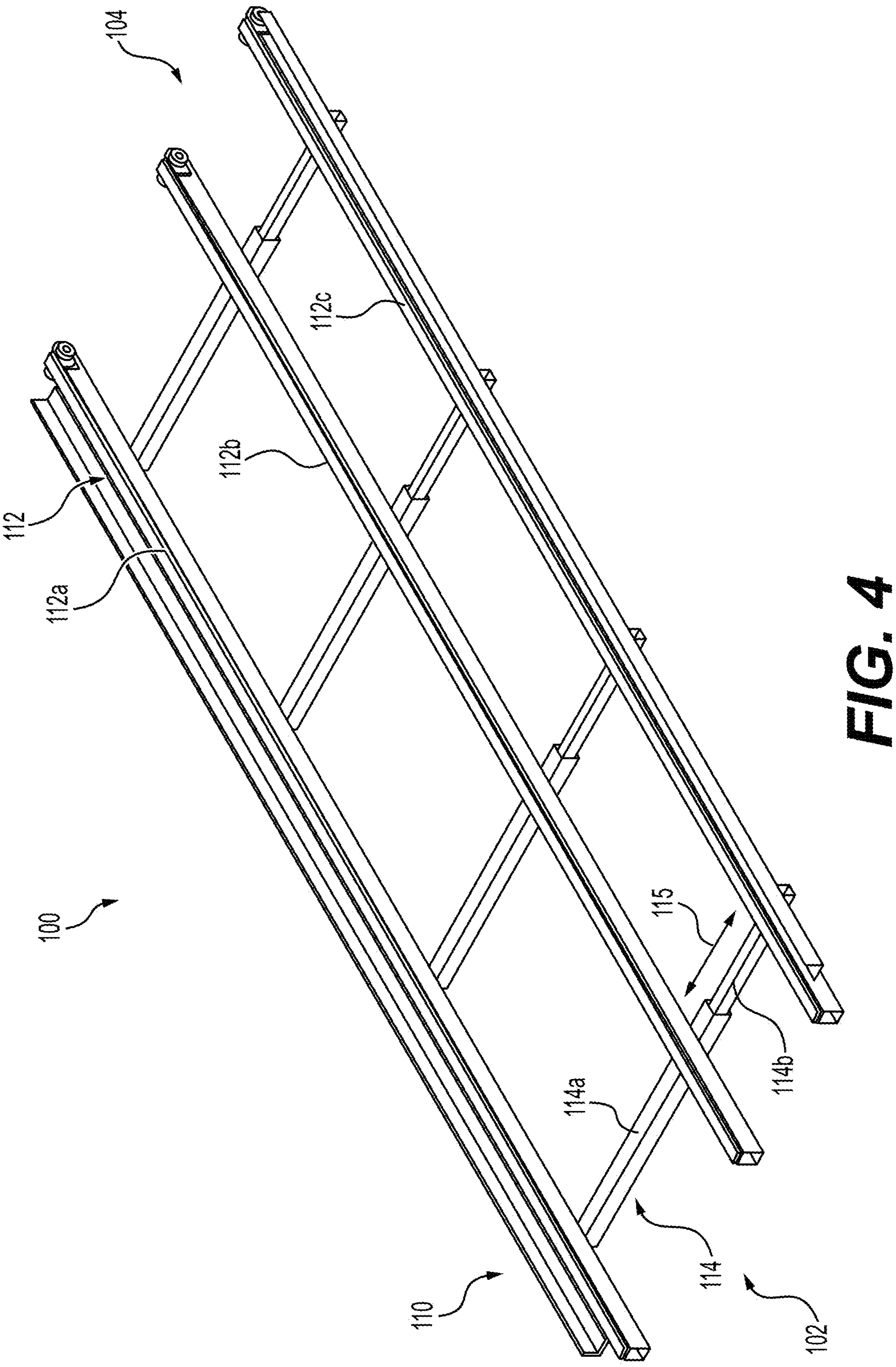
FIG. 4 is a perspective view of a wall frame conveyor isolated from the stud straightener system, according to the present disclosure.

FIG. 4 is a perspective view of the wall frame conveyor 110 with the stud straightener assembly 120 removed, according to the present disclosure. As shown in FIG. 4, the plurality of tracks 112 includes a first track 112*a*, a second track 112*b*, and a third track 112*c*. The one or more cross-members 114 include a static cross-member 114*a* and an extendable cross-member 114*b*. The extendable cross-member 114*b* is laterally extendable relative to the static cross-member 114*a* as indicated by arrow 115. For example, the extendable cross-member 114*b* slides into, or out of, a cavity formed along a length of the static cross-member 114*a*.

The first track 112*a* is coupled to the static cross-member 114*a* at a first lateral end of the one or more cross-members 114. The second track 112*b* is spaced laterally from the first track 112*a*, and is also coupled to the static cross-member 114*a*. The third track 112*c* is spaced laterally from the second track 112*b* on a side opposite the first track 112*a*. The third track 112*c* is coupled to the extendable cross-member 114*b*. In this way, the third track 112*c* is movable laterally to expand a width of the wall frame conveyor 110 to accommodate wall structures 10 of various lengths and sizes. In particular, the extendable cross-member 114*b* extends laterally to move the third track 112*c* towards, or away from, the second track 112*b*. The tracks 112 are all rotatably linked together by a common driveshaft that is driven by a motor, such that the tracks 112 all rotate and/or move at substantially a same rate of speed.

Figure 5:
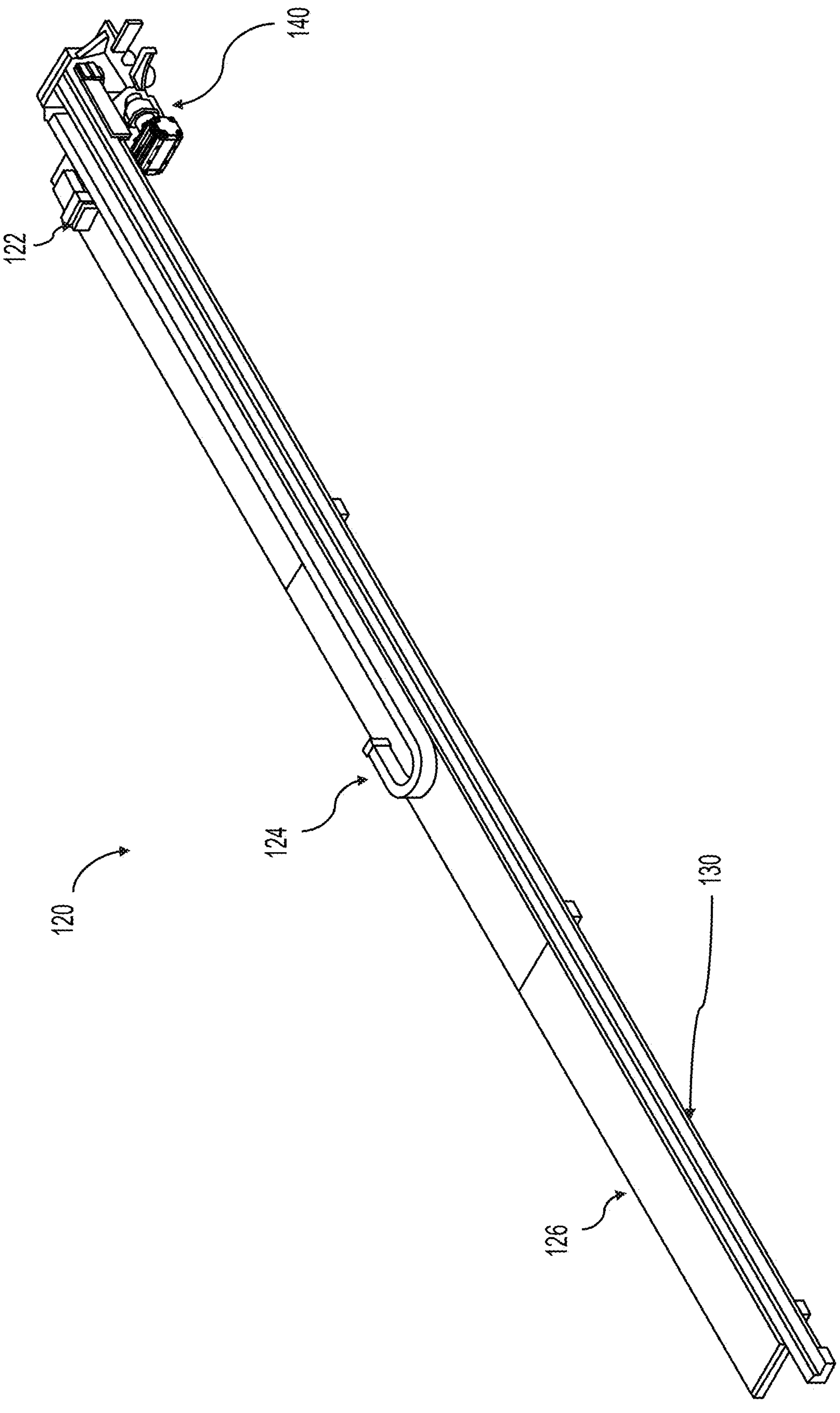
FIG. 5 is a perspective view of a stud straightener assembly isolated from the stud straightener, according to the present disclosure.

FIG. 5 is a perspective view of the stud straightener assembly 120 isolated from the stud straightener system 100, according to the present disclosure. The stud straightener assembly 120 is coupled to the wall frame conveyor 110, for example, on the cross-members 114 such that the stud straightener assembly 120 extends longitudinally from the first end 102 to the second end 104. The stud straightener assembly 120 includes a valve bank 122, an energy chain 124, one or more energy chain support plates 126, an actuator assembly 130, and a carriage tooling assembly 140. The valve bank 122 provides a hub for wiring and plumbing from a main wiring cabinet of the system for supplying power to the carriage tooling assembly 140. The energy chain 124 includes wiring and plumbing from the valve bank 122 to the carriage tooling assembly 140 while the carriage tooling assembly 140 is in motion (e.g., as the carriage tooling assembly 140 moves along a length of the actuator assembly 130), as detailed further below. In this way, the energy chain 124 supplies power to the carriage tooling assembly 140. The energy chain support plates 126 support the energy chain 124 thereon. The energy chain support plates 126 also support the actuator assembly 130 such that the carriage tooling assembly 140 can move longitudinally along the energy chain support plates 126.

Figure 6:
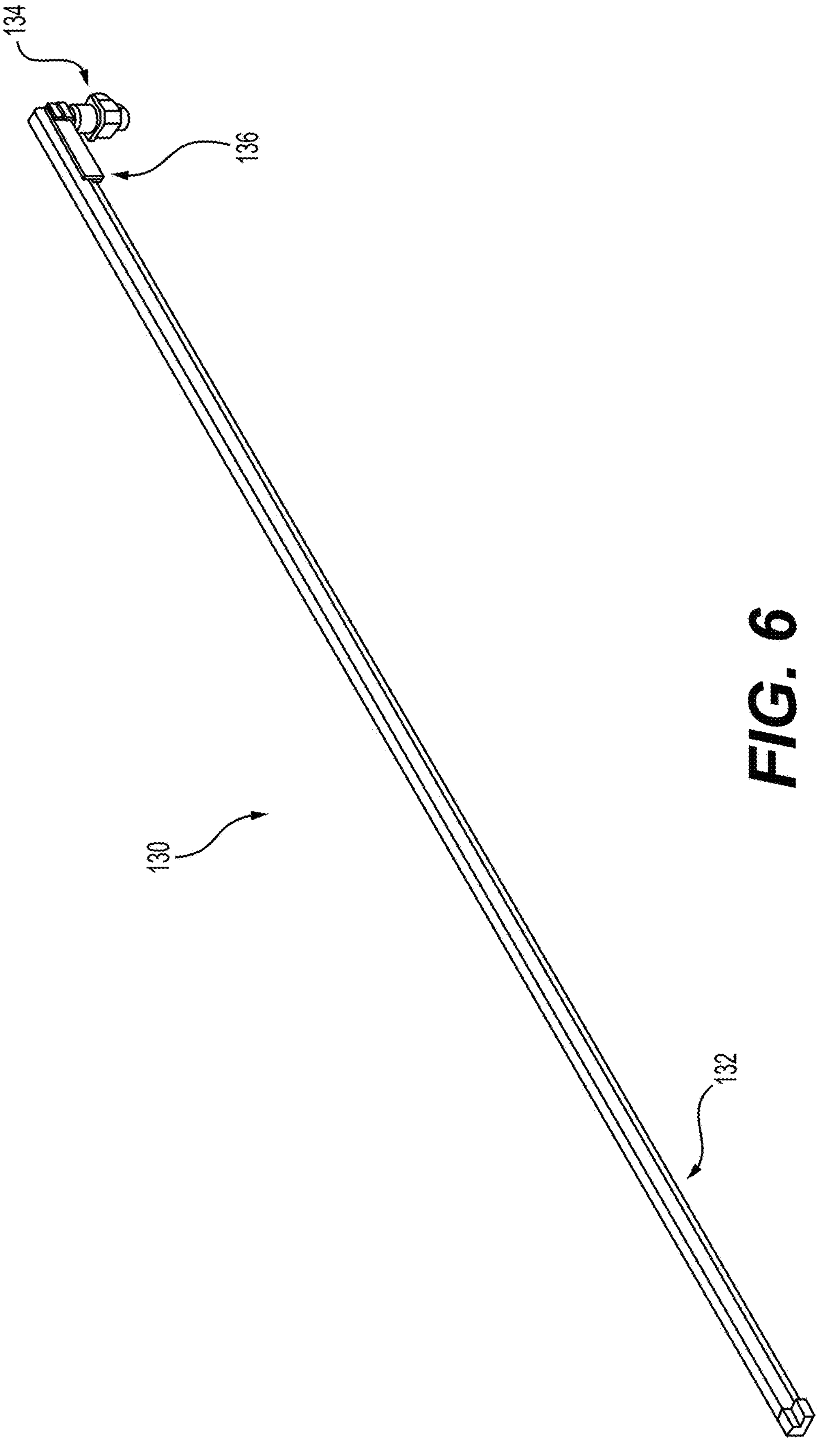
FIG. 6 is a perspective view of an actuator assembly of the stud straightener assembly and isolated from the stud straightener assembly, according to the present disclosure.

FIG. 6 is a perspective view of the actuator assembly 130 isolated from the stud straightener assembly 120, according to the present disclosure. The actuator assembly 130 includes an actuator 132, a servo motor and gearbox 134, and a carriage plate 136. The actuator 132 defines a track on which the carriage plate 136 moves along. In particular, the carriage tooling assembly 140 is coupled to the carriage plate 136 such that the carriage tooling assembly 140 is movable along the actuator 132. The servo motor and gearbox 134 comprises a motor coupled to a sensor for position feedback of the carriage plate 136 (e.g., of the carriage tooling assembly 140). The servo motor and gearbox 134 includes a closed-loop servomechanism that uses position feedback to control motion and a position of the carriage plate 136 along the actuator 132. The servo motor and gearbox 134 receives signals indicative of the position of the carriage plate 136 and determines the position of the carriage plate 136 along the actuator 132 based on the signals. The servo motor and gearbox 134 can include a variable-speed drive to control the motor speed, and, thus, control the speed of the carriage plate 136 as the carriage plate 136 moves along the actuator 132. In this way, the servo motor and gearbox 134 can move the carriage tooling assembly 140 along the actuator 132 to align with the studs 16 of the wall structure 10 to straighten the studs 16, as detailed further below.

Figure 7A:
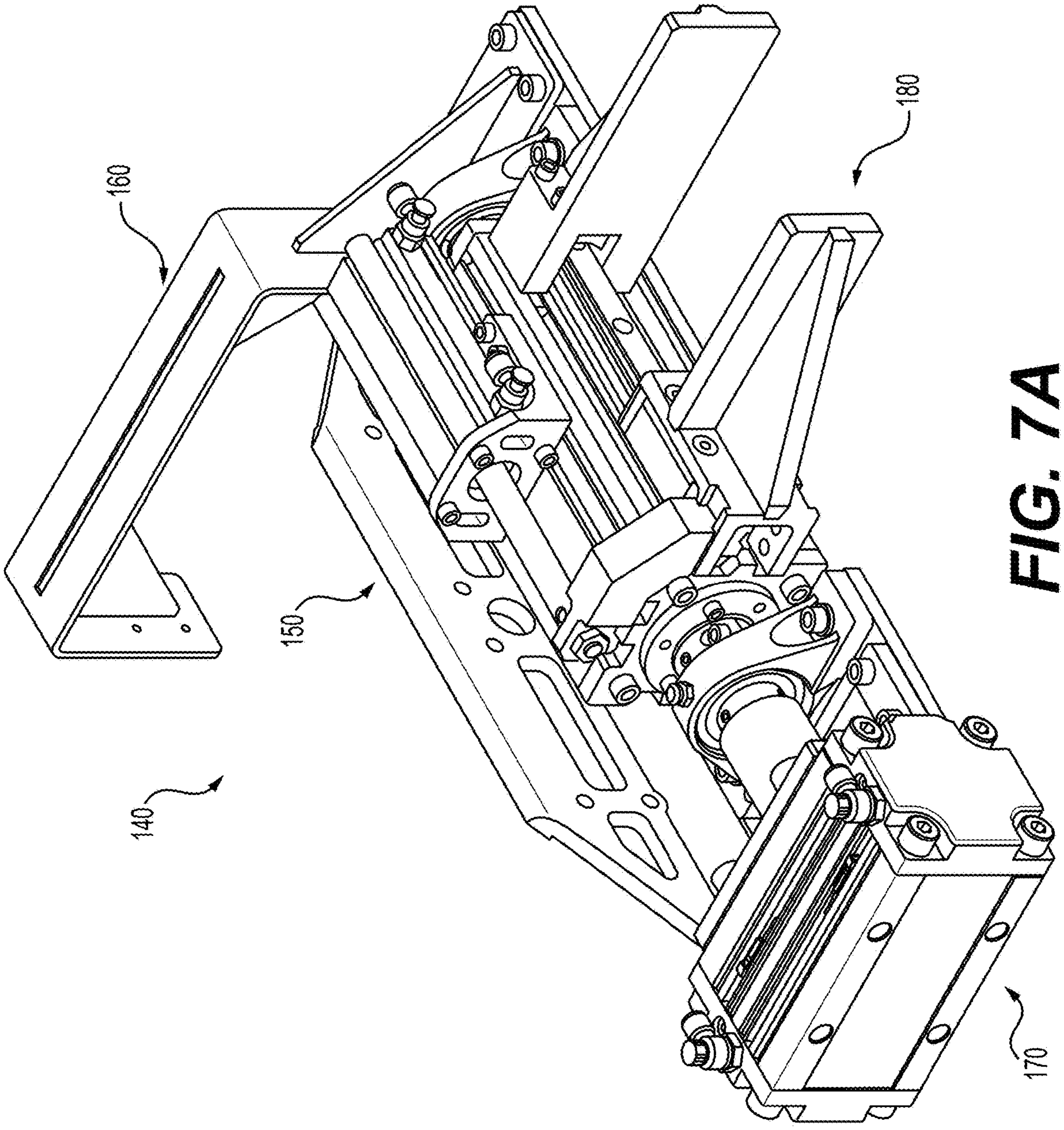
FIG. 7A is a perspective view of a carriage tooling assembly of the stud straightener assembly and in a horizontal position, according to the present disclosure.
Figure 7B:
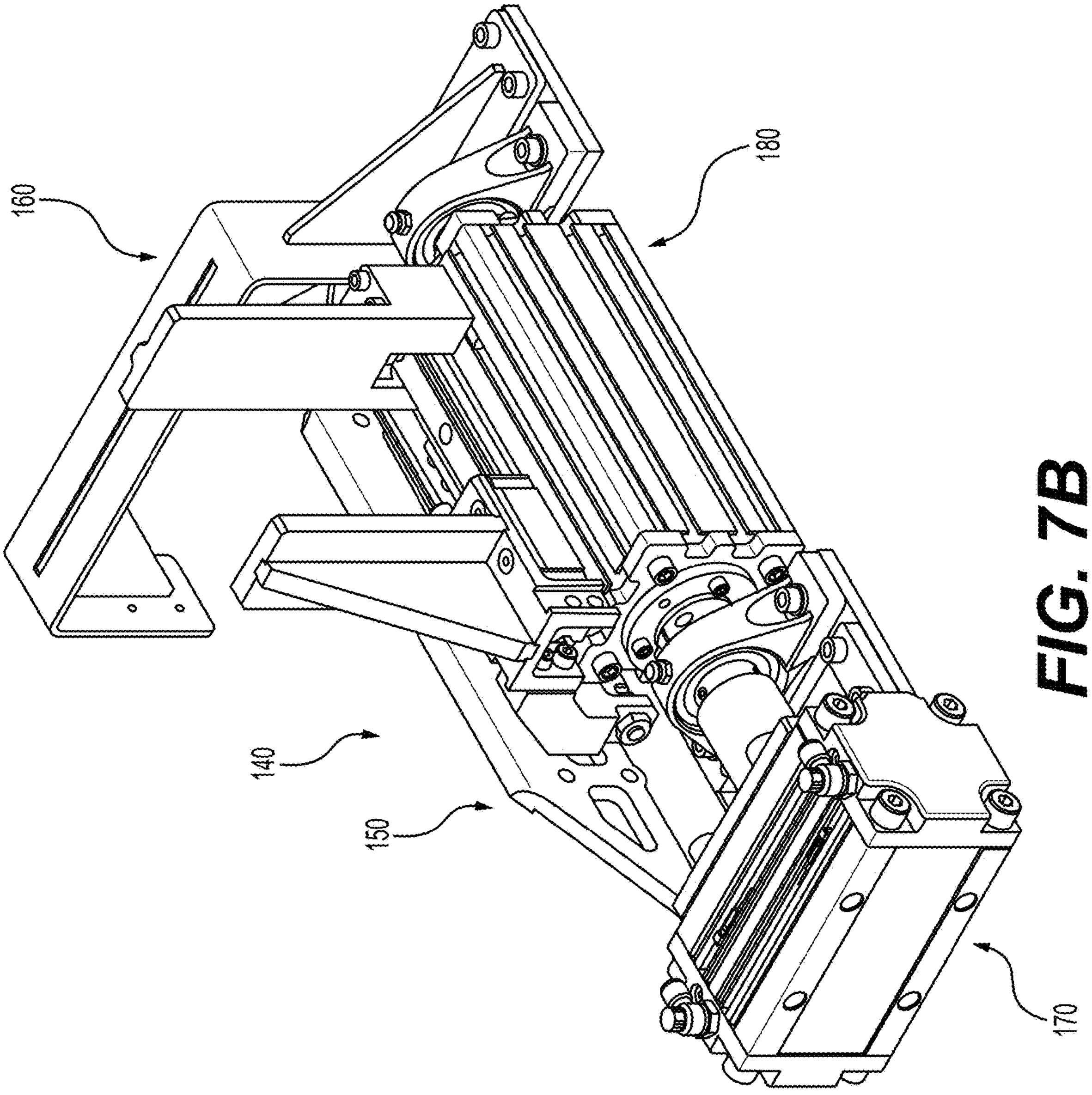
FIG. 7B is a perspective view of the carriage tooling assembly in a vertical position, according to the present disclosure.
Figure 7C:
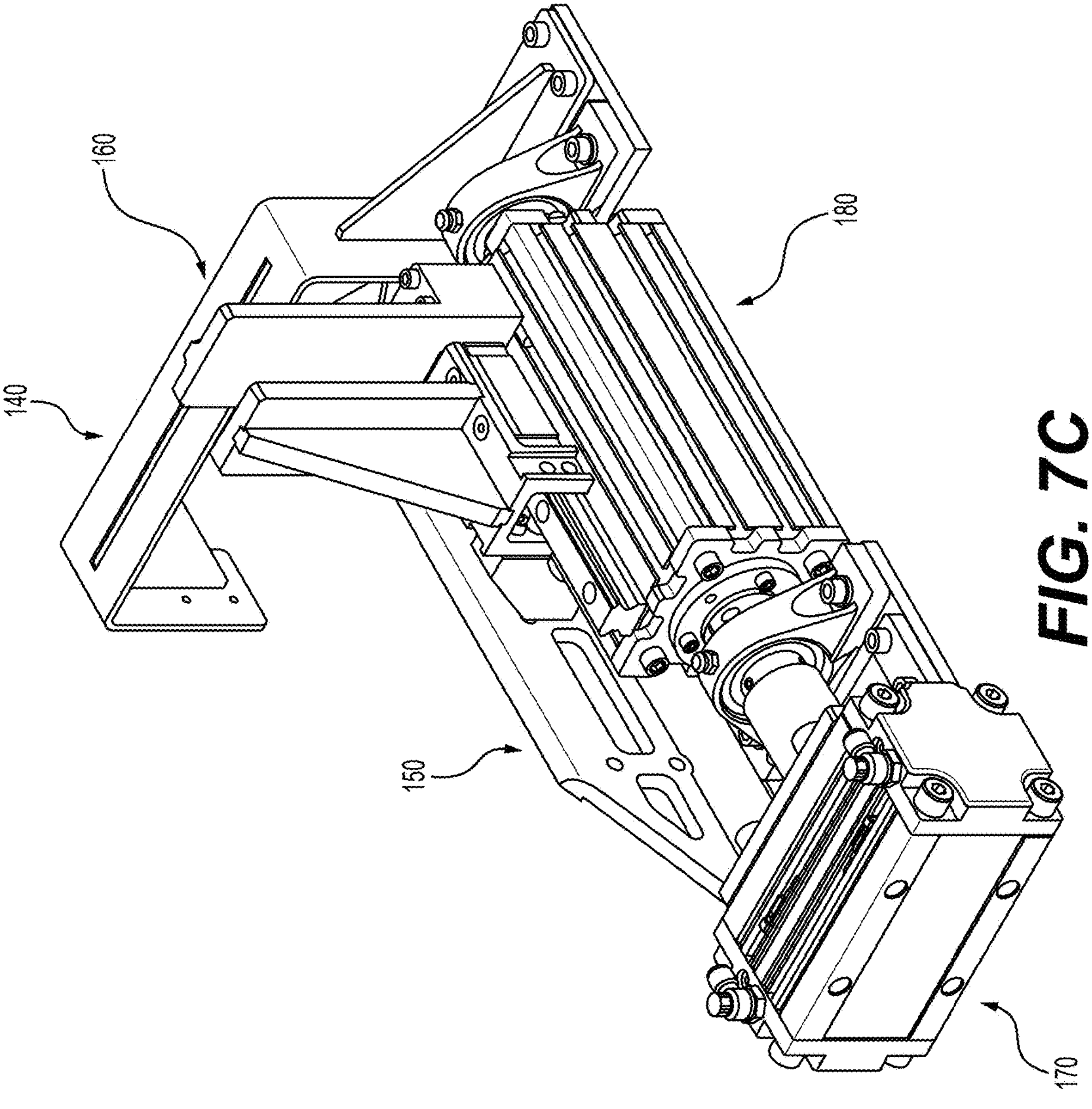
FIG. 7C is a perspective view of the carriage tooling assembly in a clamped state, according to the present disclosure.

FIG. 7A is a perspective view of the carriage tooling assembly 140 of the stud straightener assembly 120 with the carriage tooling assembly 140 being in a horizontal position, according to the present disclosure. FIG. 7B is a perspective view of a clamp tooling assembly 180 of the carriage tooling assembly 140 in the vertical position, according to the present disclosure. FIG. 7C is a perspective view of the clamp tooling assembly 180 of the carriage tooling assembly 140 in a clamped state, according to the present disclosure.

The carriage tooling assembly 140 includes a carriage bracket 150, an energy chain bracket 160, a rotary actuator 170, and the clamp tooling assembly 180. The carriage bracket 150 supports the energy chain bracket 160, the rotary actuator 170, and the clamp tooling assembly 180 thereon. The carriage bracket 150 also couples the carriage tooling assembly 140 to the carriage plate 136 of the actuator assembly 130 to movably couple the carriage tooling assembly 140 to the actuator assembly 130. The energy chain bracket 160 is coupled to the carriage bracket 150 and to the energy chain 124. In this way, the wiring of the energy chain 124 is routed to the carriage tooling assembly 140 along the energy chain bracket 160. The rotary actuator 170 is coupled to the carriage bracket 150. The rotary actuator 170 includes any type of rotary actuator, such as, for example, an electrical rotary actuator, a hydraulic rotary actuator, a pneumatic rotary actuator, or the like, for producing rotary motion or torque. The rotary actuator 170 is drivingly coupled to the clamp tooling assembly 180 for rotating the clamp tooling assembly 180 from a horizontal position (FIG. 7A) to a vertical position (FIGS. 7B and 7C), as detailed further below. When the clamp tooling assembly 180 is in the vertical position, the clamp tooling assembly 180 closes (FIG. 7C) to straighten the studs 16, as detailed further below.

Figure 8:
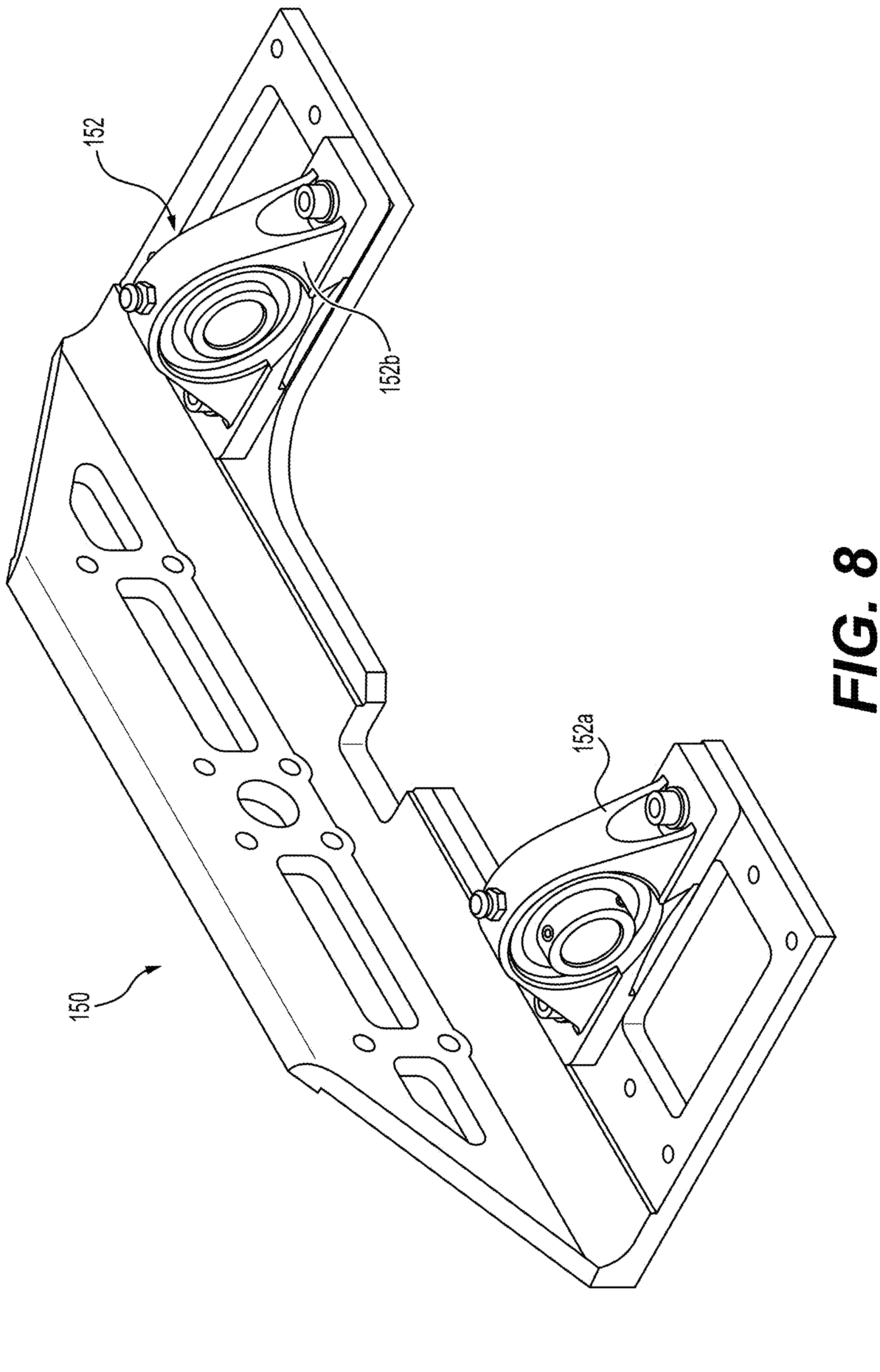
FIG. 8 is a perspective view of a carriage bracket of the carriage tooling assembly, according to the present disclosure.

FIG. 8 is a perspective view of the carriage bracket 150 isolated from the carriage tooling assembly 140, according to the present disclosure. The carriage bracket 150 includes one or more carriage bracket bearings 152 mounted on the carriage bracket 150. The one or more carriage bracket bearings 152 are pillow block bearings that include a pedestal that supports a rotary shaft (e.g., of the rotary actuator 170), and having bearings disposed therein for supporting rotation of the rotary shaft. The one or more carriage bracket bearings 152 can include any type of rolling element, such as, for example, balls, cylindrical rollers, spherical rollers, tapered rollers, or the like, for supporting rotation of the rotary shaft. In FIG. 8, the one or more carriage bracket bearings 152 include a first carriage bracket bearing 152*a* and a second carriage bracket bearing 152*b*. While two carriage bracket bearings 152 are shown in FIG. 8, the carriage bracket 150 can include any number of carriage bracket bearings 152, as desired or as necessary for supporting the rotary shaft and allowing the rotary shaft to rotate therein.

Figure 9:
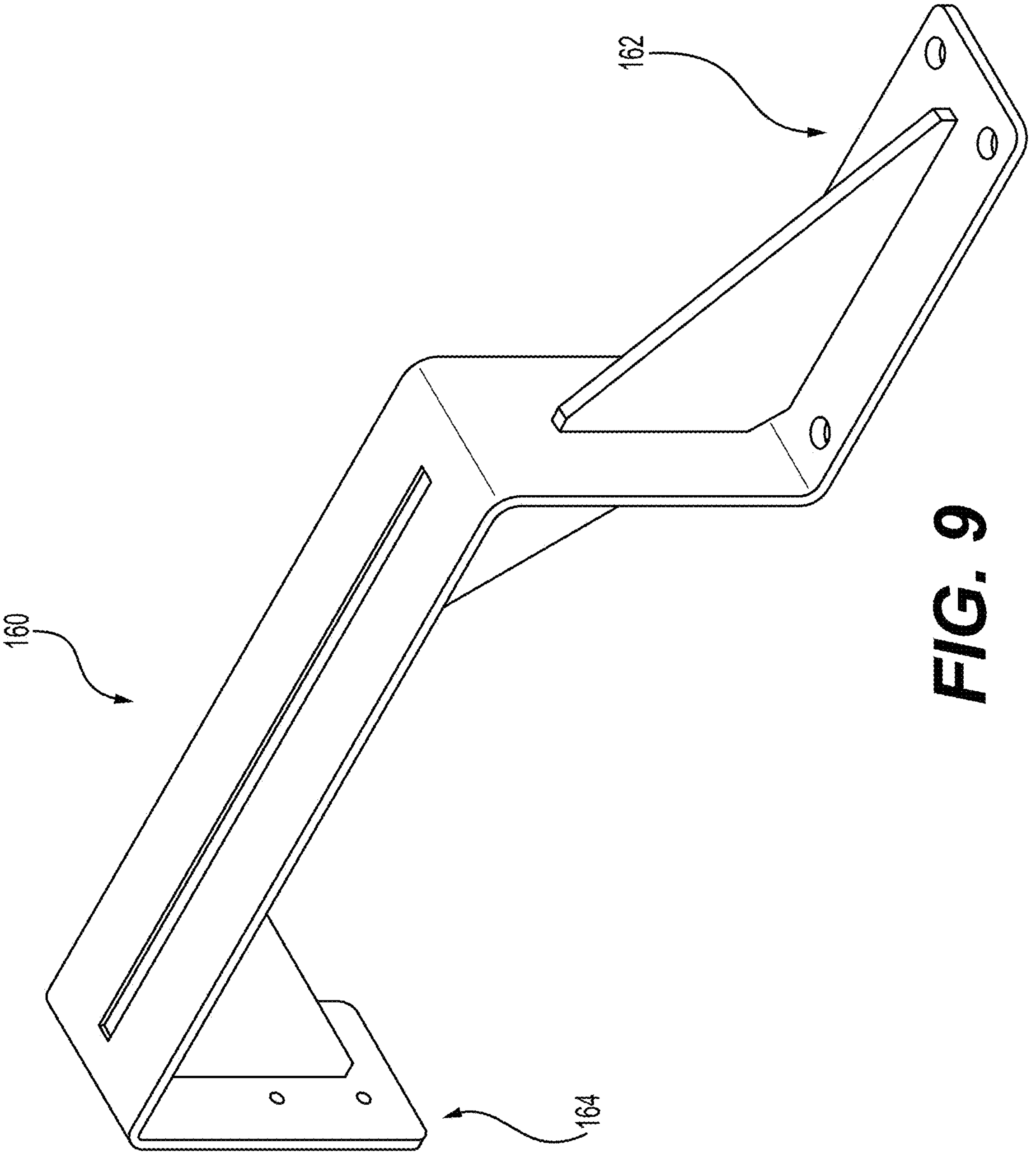
FIG. 9 is a perspective view of an energy chain bracket of the carriage tooling assembly, according to the present disclosure.

FIG. 9 is a perspective view of the energy chain bracket 160 isolated from the carriage tooling assembly 140, according to the present disclosure. The energy chain bracket 160 includes a carriage bracket coupling 162 and an energy chain coupling 164. The carriage bracket coupling 162 couples the energy chain bracket 160 to the carriage bracket 150 by one or more fastening mechanisms. The one or more fastening mechanisms can be, for example, bolts, welding, or the like, for fastening the energy chain bracket 160 to the carriage bracket 150. In some embodiments, the energy chain bracket 160 can form a single, unitary component with the carriage bracket 150. The energy chain coupling 164 couples the energy chain bracket 160 to the energy chain 124 by one or more fastening mechanisms, such as, for example, bolts, welding, or the like, for fastening the energy chain bracket 160 to the energy chain 124. In some embodiments, the energy chain bracket 160 can form a single, unitary component with the energy chain 124. In this way, the energy chain bracket 160 couples the carriage tooling assembly 140 to the energy chain 124 such that the energy chain 124 can move with the carriage tooling assembly 140 along the length of the actuator assembly 130.

Figure 10:
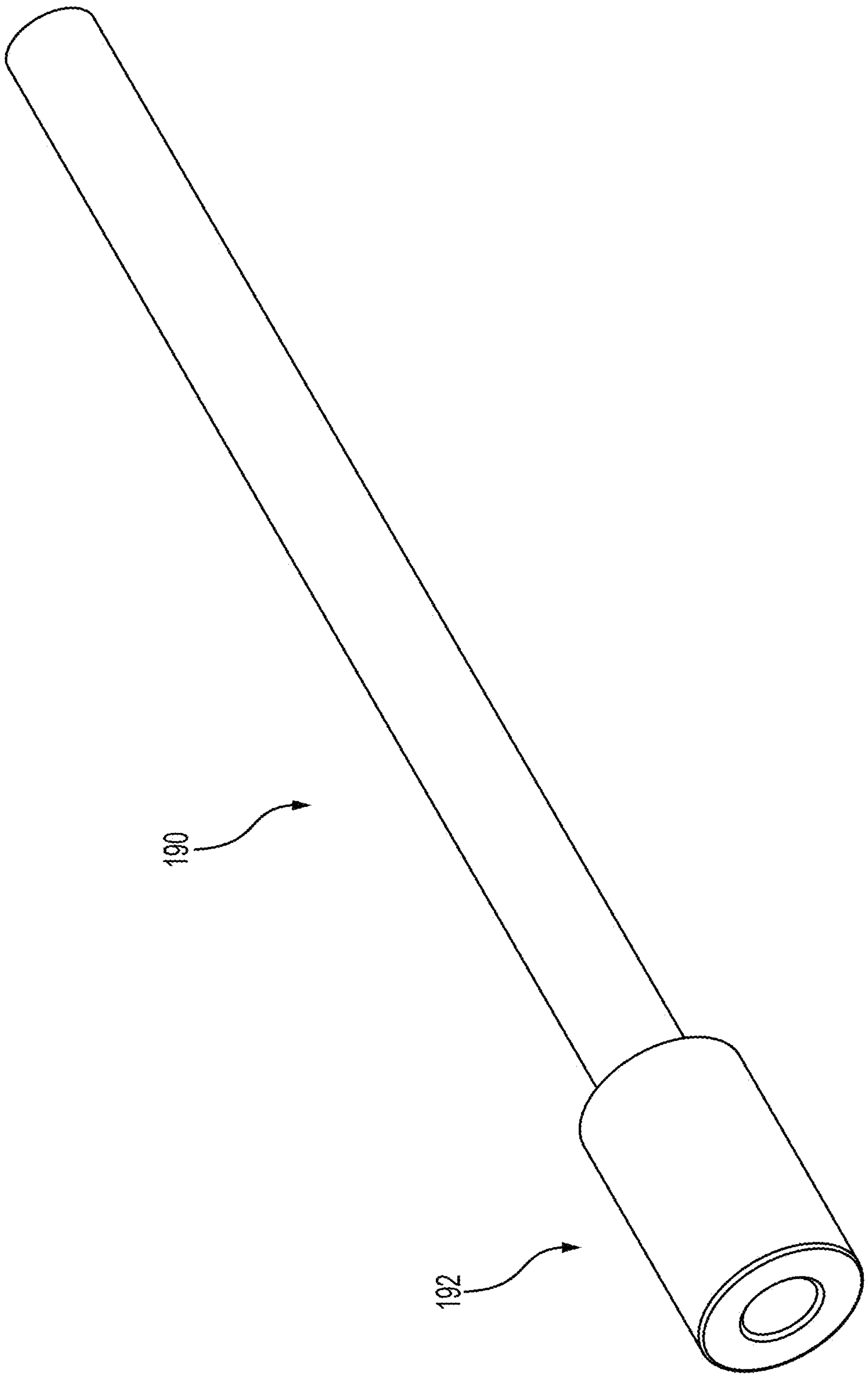
FIG. 10 is a perspective view of a rotary shaft of the carriage tooling assembly, according to the present disclosure.

FIG. 10 is a perspective view of a rotary shaft 190 of the rotary actuator 170 of the carriage tooling assembly 140, according to the present disclosure. The rotary shaft 190 includes a rotary actuator coupling 192 for rotatably coupling the rotary shaft 190 to the rotary actuator 170. In this way, the rotary actuator 170 rotates the rotary shaft 190. The rotary shaft 190 is mounted through the one or more carriage bracket bearings 152 such that the one or more carriage bracket bearings 152 support the rotary shaft 190. The rotary shaft 190 extends through the clamp tooling assembly 180 and the clamp tooling assembly 180 is coupled to the rotary shaft 190 such that the clamp tooling assembly 180 rotates with rotation of the rotary shaft 190, as detailed further below.

Figure 11B:
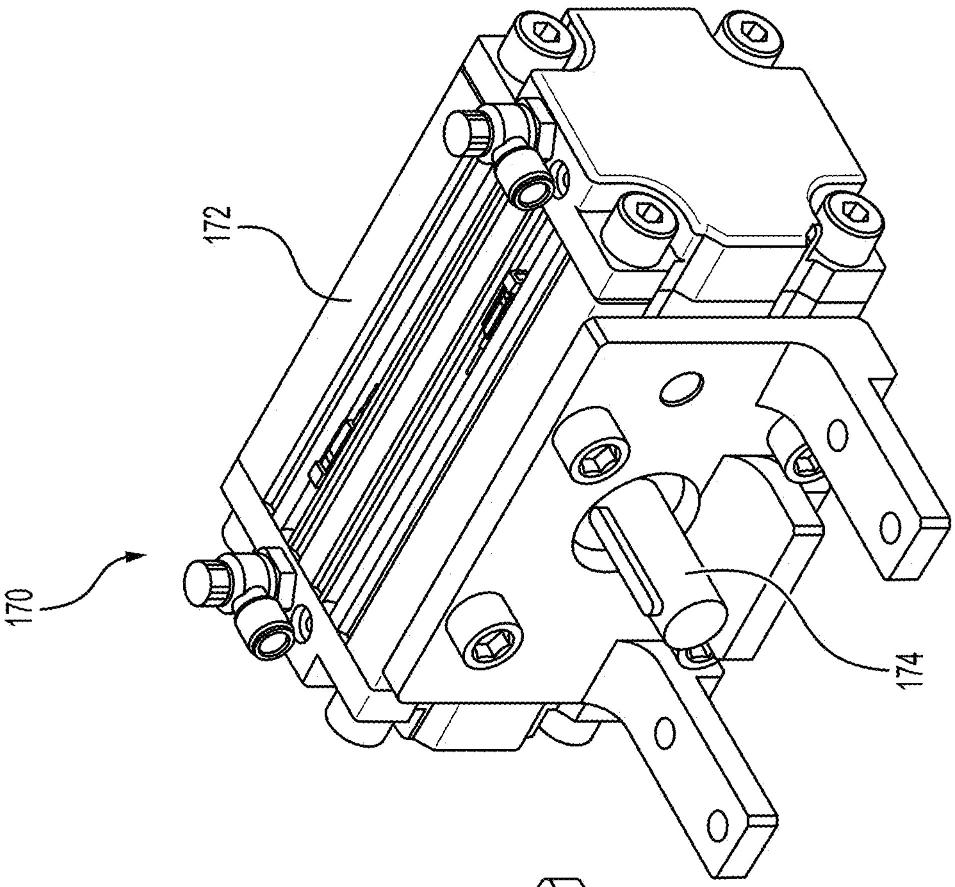
FIG. 11B is a perspective rearward view of the rotary actuator, according to the present disclosure.
Figure 11A:
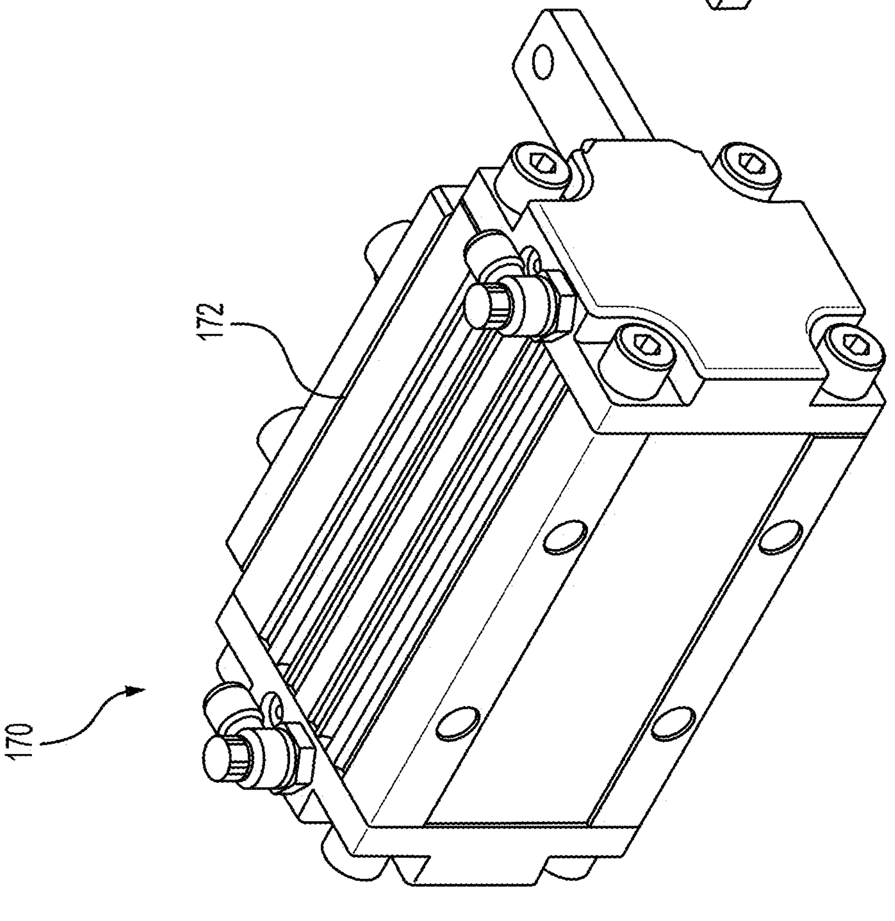
FIG. 11A is a perspective forward view of a rotary actuator of the carriage tooling assembly, according to the present disclosure.

FIG. 11A is a perspective forward view of the rotary actuator 170 of the carriage tooling assembly 140, according to the present disclosure. FIG. 11B is a perspective rearward view of the rotary actuator 170, according to the present disclosure. The rotary actuator 170 includes a rotary actuator housing 172 and an output shaft 174. The rotary actuator housing 172 houses the components of the rotary actuator 170, such as, for example, motors, a pneumatic system, a hydraulic system, for producing rotary motion. The output shaft 174 is drivingly coupled to the components of the rotary actuator 170 such that the rotary motion produced by the rotary actuator 170 rotates the output shaft 174. As discussed above, the rotary shaft 190 is coupled to the rotary actuator 170. In particular, the rotary actuator coupling 192 of the rotary shaft 190 is coupled to the output shaft 174. In this way, the rotary actuator 170 rotates the rotary shaft 190, thereby rotating the clamp tooling assembly 180, as detailed further below.

Figure 12B:
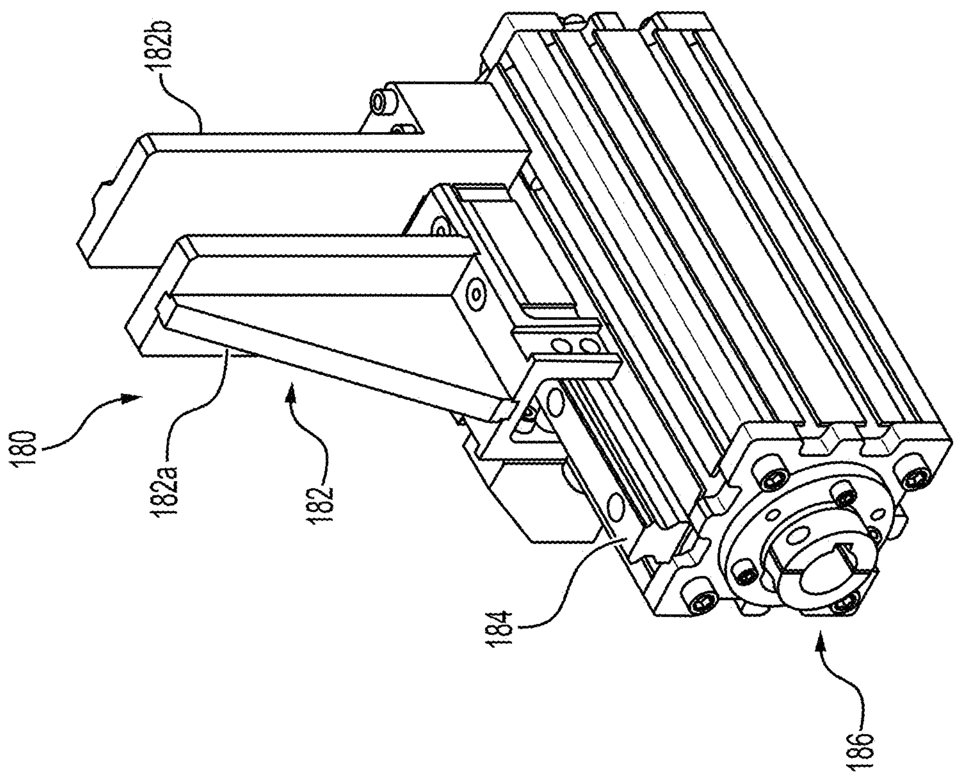
FIG. 12B is a perspective view of the clamp tooling in the closed position, according to the present disclosure.
Figure 12A:
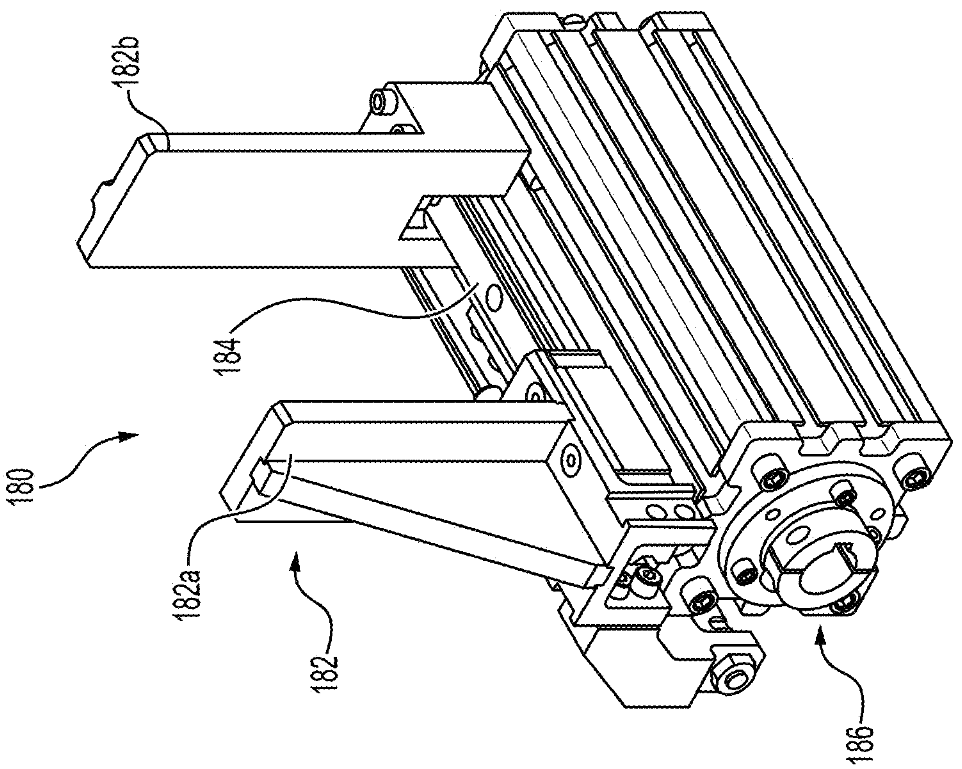
FIG. 12A is a perspective view of a clamp tooling of the carriage tooling assembly in the vertical position, according to the present disclosure.

FIG. 12A is a perspective view of the clamp tooling assembly 180 of the carriage tooling assembly 140 in the vertical position, according to the present disclosure. FIG. 12B is a perspective view of the clamp tooling assembly 180 in the closed position, according to the present disclosure. The clamp tooling assembly 180 includes a clamp 182, a clamp track 184, and a clamp collar 186. The clamp 182 includes a first clamp member 182*a* and a second clamp member 182*b*. The first clamp member 182*a* and the second clamp member 182*b* are generally plate-like structures each having a generally flat clamping surface. The clamp 182 is movably coupled to the clamp track 184. In particular, the first clamp member 182*a* and the second clamp member 182*b* are movably coupled to the clamp track 184. The first clamp member 182*a* and the second clamp member 182*b* are controlled to be opened (e.g., moved along the clamp track 184 away from each other) and closed (e.g., moved along the clamp track 184 toward each other) for clamping a respective stud 16, as detailed further below. The rotary shaft 190 is coupled to the clamp tooling assembly 180 to rotate the clamp tooling assembly 180 (e.g., the clamp 182) from the horizontal position (FIG. 12A) to the vertical position (FIG. 12B). In particular, the rotary shaft 190 is inserted through the clamp collar 186 and coupled within the clamp tooling assembly 180. In this way, the rotary actuator 170 controls the rotary shaft 190 to rotate, thereby rotating the clamp tooling assembly 180 (e.g., the clamp 182) such that each of the first clamp member 182*a* and the second clamp member 182*b* are rotated from the horizontal position to the vertical position.

Figure 13A:
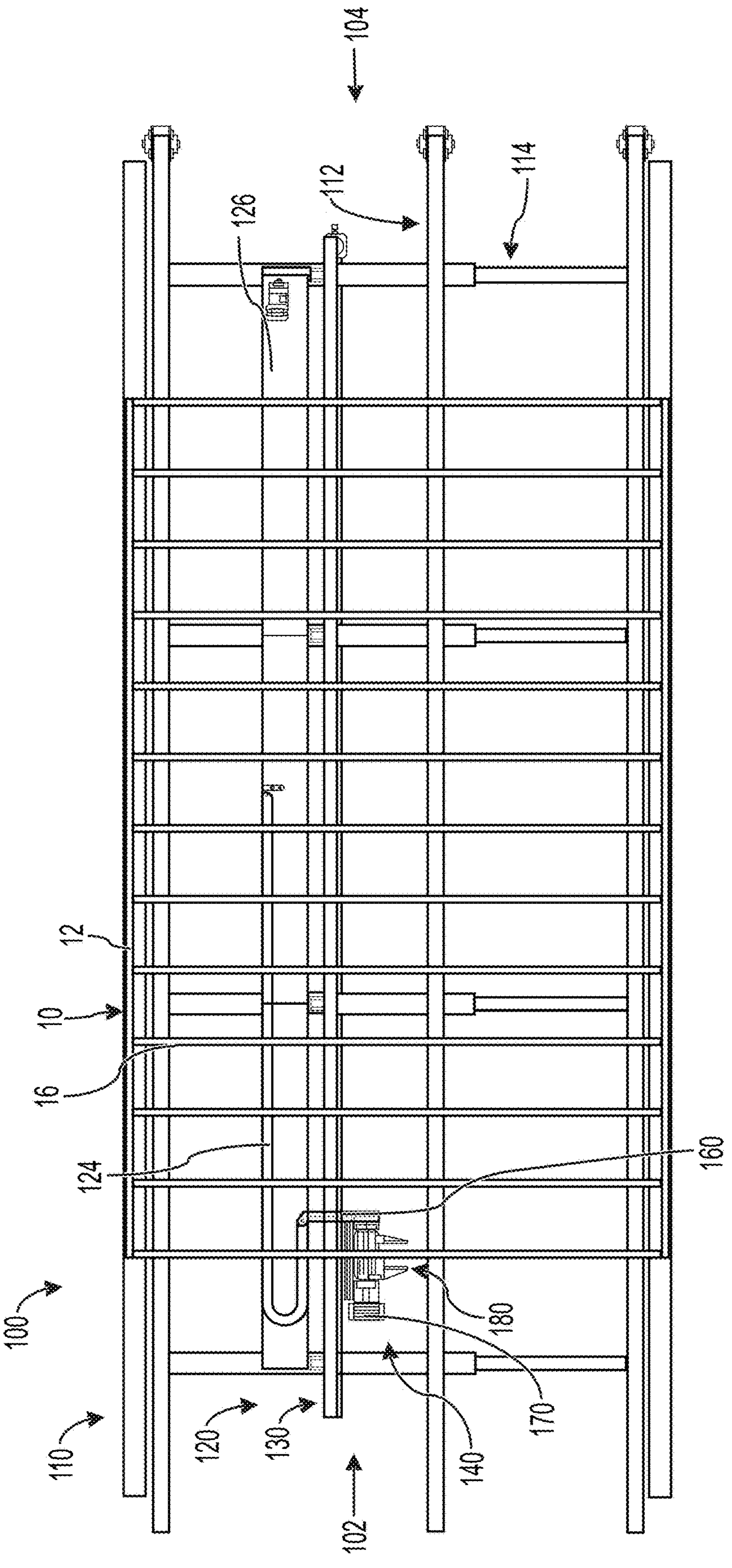
FIG. 13A is a top plan view of the stud straightener system with the wall frame thereon and the carriage tooling assembly at a first end of the stud straightener system, according to the present disclosure.
Figure 13B:
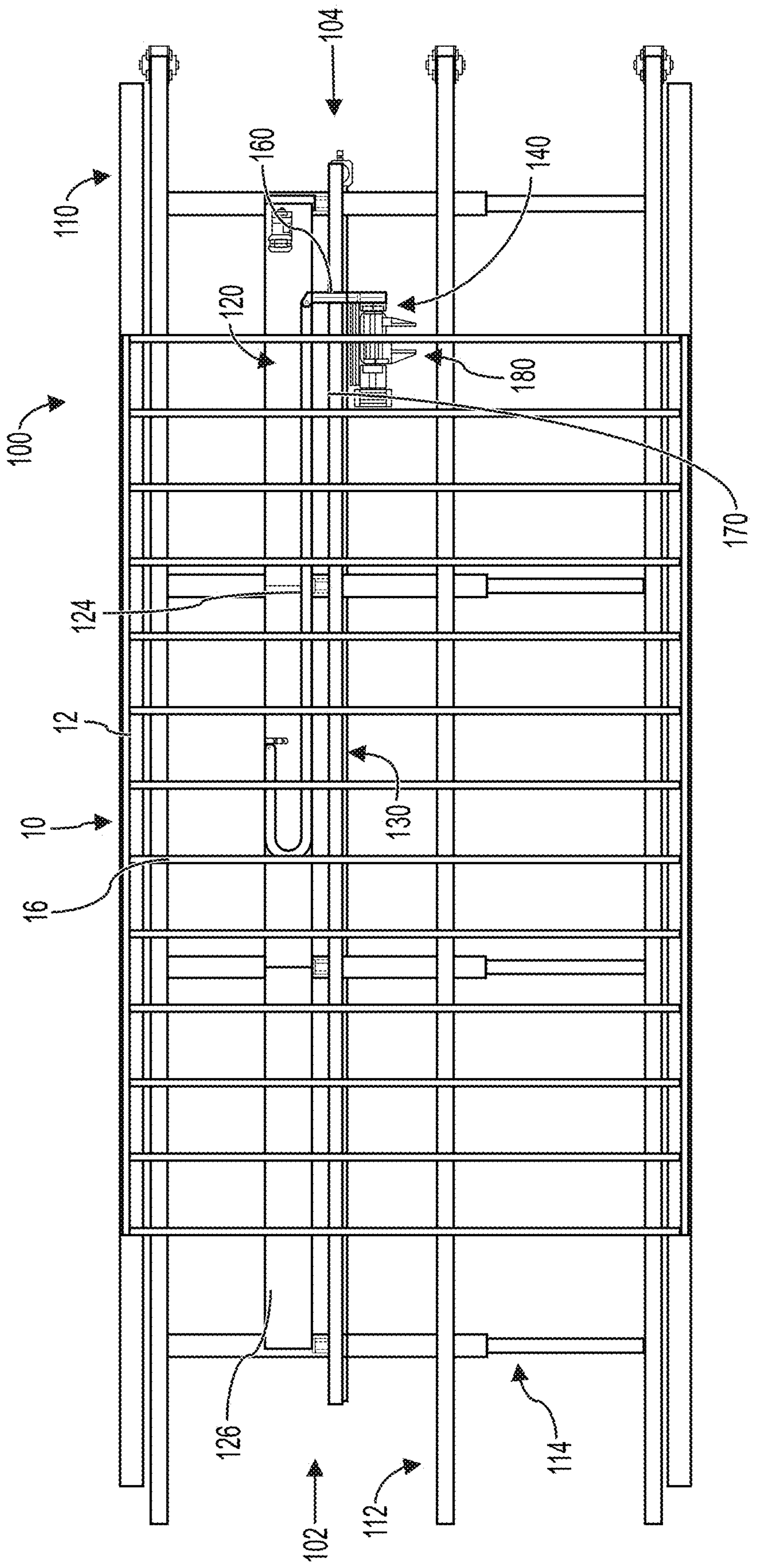
FIG. 13B is a top plan view of the stud straightener system with the wall frame thereon and the carriage tooling assembly at a second end of the stud straightener system, according to the present disclosure.

FIG. 13A is a top plan view of the stud straightener system 100 with the wall frame 12 thereon and the carriage tooling assembly 140 at the first end 102 of the stud straightener system 100, according to the present disclosure. FIG. 13B is a top plan view of the stud straightener system 100 with the wall frame 12 thereon and the carriage tooling assembly 140 at the second end 104 of the stud straightener system 100, according to the present disclosure. The sheathing panels 14 are removed in FIGS. 13A and 13B for clarity.

The wall frame 12 includes thirteen studs 16 in FIGS. 13A and 13B (labeled 1 to 13). In operation, the wall structure 10 enters the stud straightener system 100 with the sheathing panels 14 resting on the wall frame 12 (FIG. 1) and unfastened (e.g., the sheathing panels 14 are not yet coupled to the wall frame 12). In particular, the stud straightener system 100 controls the tracks 112 to move the wall structure 10 from the first end 102 towards the second end 104 as indicated by the arrows 11. The stud straightener system 100 moves the wall structure 10 to a predetermined position on the wall frame conveyor 110 such that the processor knows the locations of the studs 16 with respect to the wall frame conveyor 110.

The position of the studs 16 can be predetermined by the stud straightener system 100. For example, the stud straightener system 100 can store the predetermined positions of the studs 16 based on the number of studs 16 of a particular wall frame 12 and a position of the wall frame 12 on the wall frame conveyor 110 when the wall frame 12 stops on the wall frame conveyor 110. The predetermined positions can be mapped and stored in a memory of the stud straightener system 100 (e.g., the memory 1730 of the computing device 1700 of FIG. 17). In some embodiments, the stud straightener system 100 can include one or more sensors (e.g., proximity sensors, or the like) that sense the positions of the studs 16 as the wall frame 12 moves along the wall frame conveyor 110. The one or more sensors can be positioned underneath the wall frame conveyor 110 and/or can be positioned on the stud straightener assembly 120. Thus, the stud straightener system 100 determines the position of the studs 16 and moves the carriage tooling assembly 140 to the position of the studs 16. In particular, the stud straightener system 100 determines the position of the studs 16 based on the predetermined positions of the studs 16 when the wall frame 12 is stopped on the wall frame conveyor 110 and/or based on the positions of the studs 16 as sensed by the one or more sensors.

The stud straightener system 100 then controls the stud straightener assembly 120 to move the carriage tooling assembly 140 to each of the studs 16. In FIGS. 13A and 13B, the stud straightener system 100 moves the carriage tooling assembly 140 to a stud 16 closest to the first end 102 first. In some embodiments, the carriage tooling assembly 140 can move to a stud 16 closest to the second end 104 first. The stud straightener system 100 can move the carriage tooling assembly 140 to any of the studs 16 in any order, as desired or as necessary. The actuator assembly 130, via the servo motor and gearbox 134, moves the carriage tooling assembly 140 moves along the actuator 132 to move the carriage tooling assembly 140. As the carriage tooling assembly 140 moves, the clamp tooling assembly 180 is in the horizontal position (FIG. 7A). In this way, the carriage tooling assembly 140 can freely move about the wall structure 10 without contacting the studs 16. The stud straightener system 100 aligns the carriage tooling assembly 140 with a center of the stud 16 such that stud 16 is aligned in a center of the clamp 182. In particular, the stud 16 is aligned between the first clamp member 182*a* and the second clamp member 182*b*. The carriage tooling assembly 140 can be aligned with the studs 16 such that the clamp tooling assembly 180 is positioned at a center of the stud 16 (e.g., a center between a top portion of the wall frame 12 and a bottom portion of the wall frame 12).

When the carriage tooling assembly 140 is aligned with the stud 16, the stud straightener system 100 controls the clamp tooling assembly 180 to rotate the clamp 182 from the horizontal position (FIG. 7A) to the vertical position (FIGS. 7B and 12A). In particular, the rotary actuator 170 rotates the rotary shaft 190, thereby rotating the clamps 182 to the vertical position. The stud straightener system 100 then controls the clamp tooling assembly 180 to close the clamp 182 to the closed position to engage the stud 16. In particular, the first clamp member 182*a* moves toward the second clamp member 182*b* along the clamp track 184 to engage the stud 16 between the first clamp member 182*a* and the second clamp member 182*b*. As the clamp 182 closes and engages the stud 16, the clamp 182 applies a load on the stud 16 to straighten the stud 16. When the stud 16 is straightened the sheathing panel 14 can be fastened to the stud 16. In particular, a fastener system can apply fasteners in the sheathing panel 14 along the stud 16 to fasten the sheathing panel 14 to the stud 16. The stud straightener system 100 can proceed as above with one or more of the studs 16 to straighten the studs 16 so that the sheathing panel 14 can be fastened to each of the studs 16. For example, the stud straightener system 100 moves the carriage tooling assembly 140 from the first end 102 (FIG. 13A) towards the second end 104 (FIG. 13B), stopping at each of the studs 16 to straighten each of the studs 16 while the fasteners are secured through the sheathing panels 14 into the studs 16. In some embodiments, the stud straightener system 100 can straighten each of the studs 16. In some embodiments, the stud straightener system 100 can straighten only some of the studs 16 (e.g., only the studs 16 that are bowed or bent).

Figure 14A:
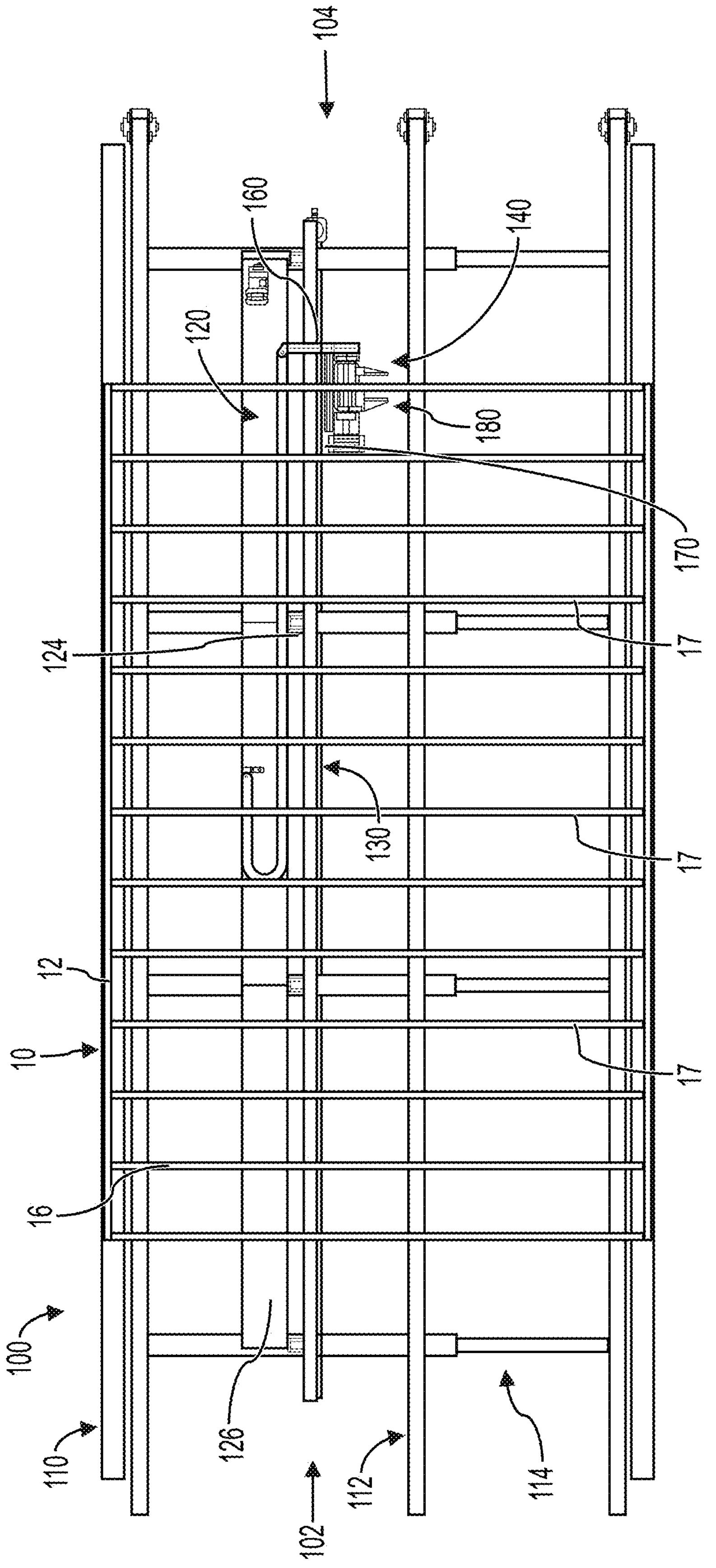
FIG. 14A is a top plan view of the stud straightener system with the wall frame thereon with the sheathing panels removed, according to the present disclosure.
Figure 14B:
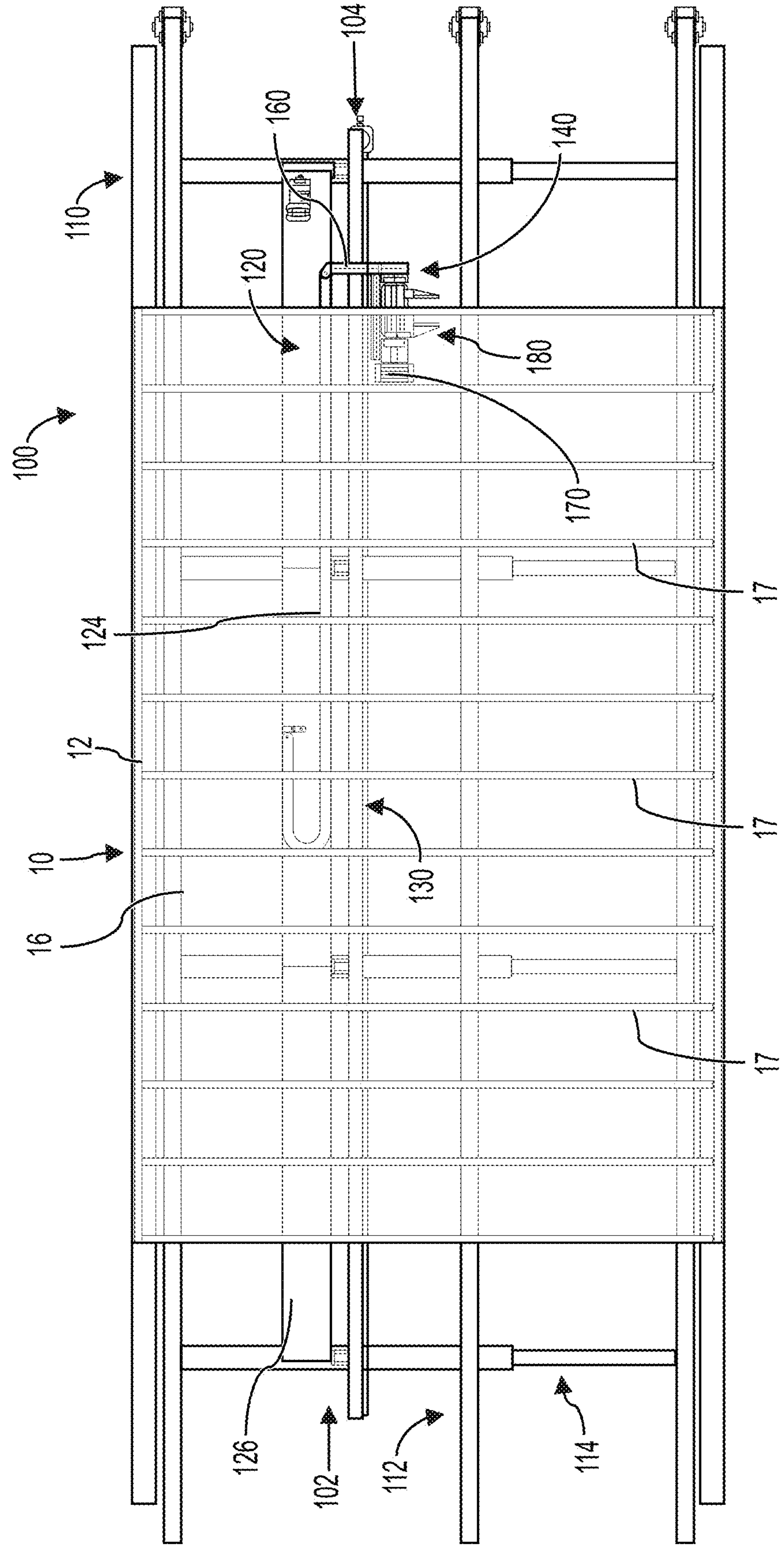
FIG. 14B is a top plan view of the stud straightener system with the wall frame thereon with the sheathing panels shown as transparent, according to the present disclosure.
Figure 15A:
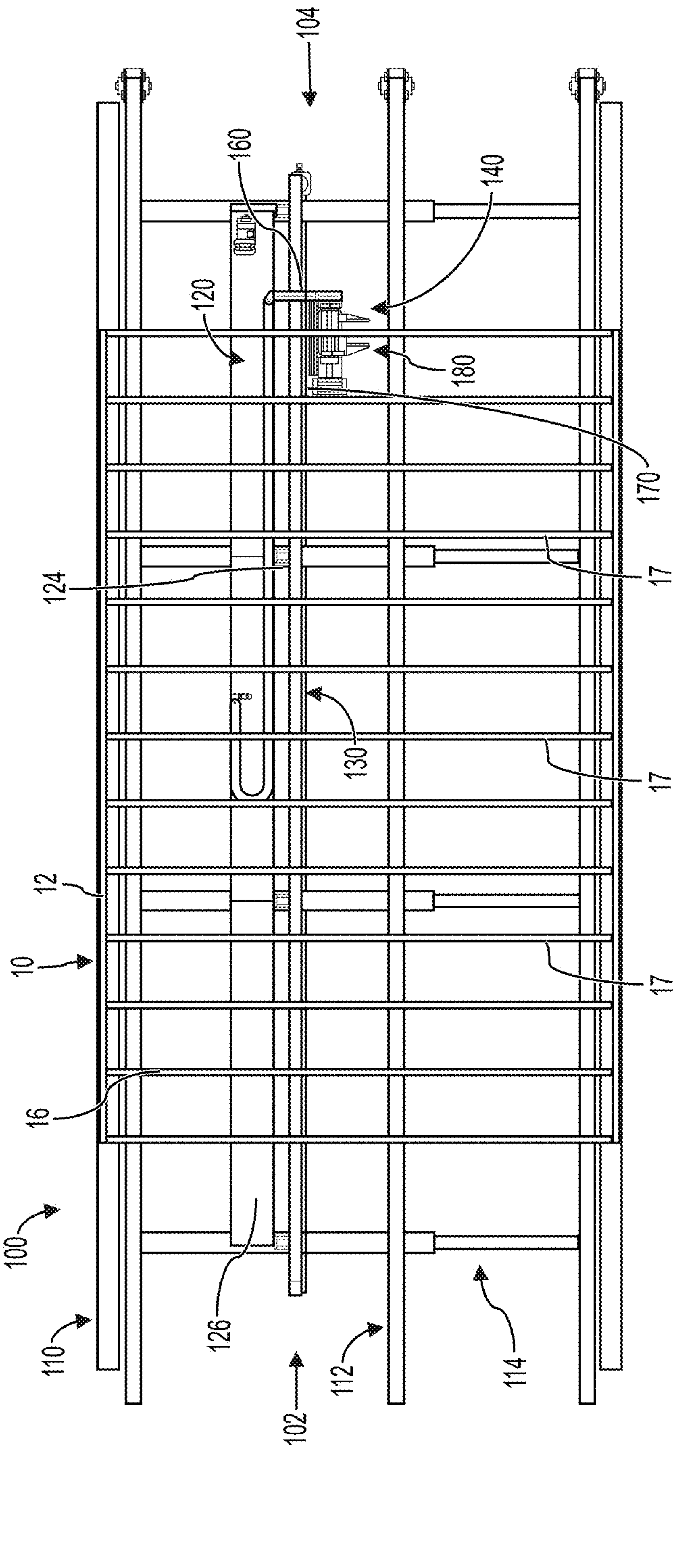
FIG. 15A is a top plan view of the stud straightener system with the wall frame thereon with the sheathing panels removed, according to another embodiment.
Figure 15B:
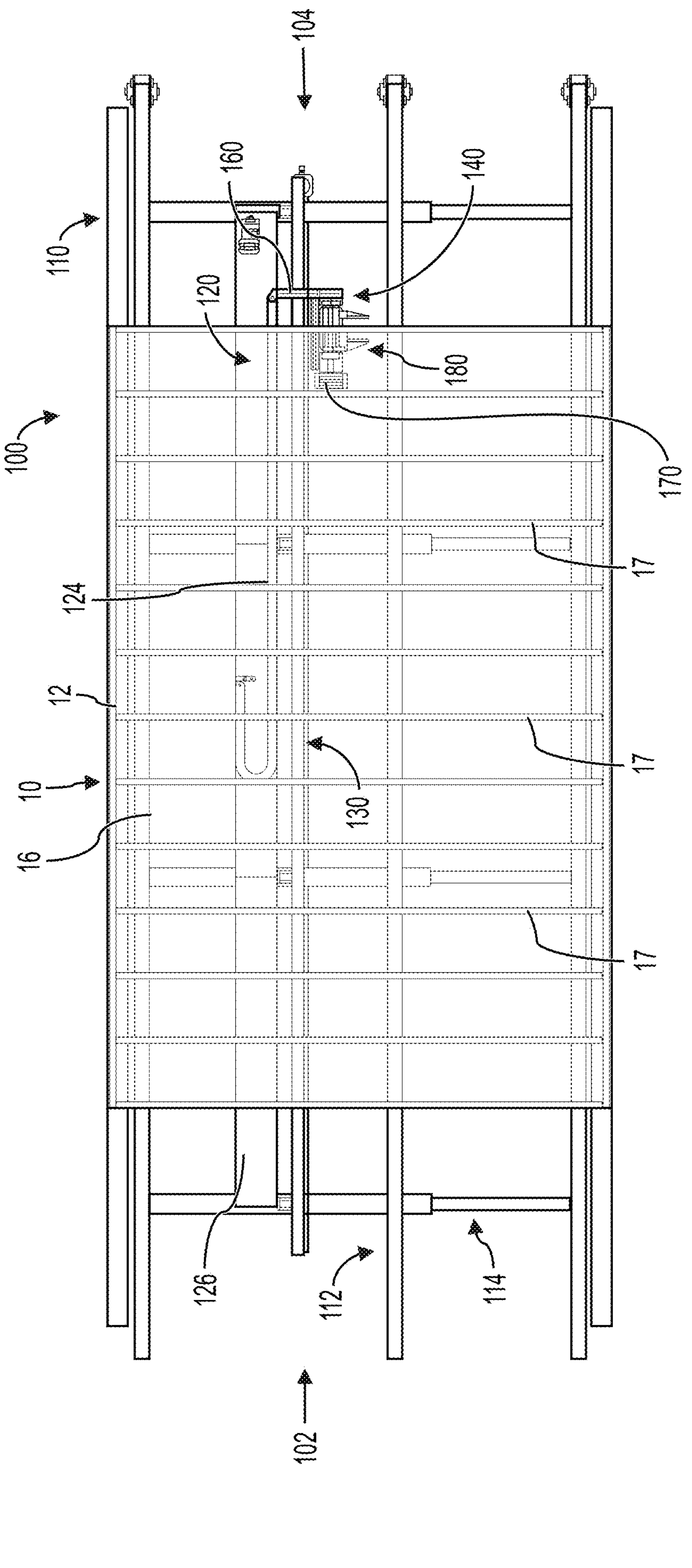
FIG. 15B is a top plan view of the stud straightener system with the wall frame thereon with the sheathing panels shown as transparent, according to another embodiment.

FIG. 14A is a top plan view of the stud straightener system 100 with the wall frame 12 thereon with the sheathing panels 14 removed, according to the present disclosure. FIG. 14B is a top plan view of the stud straightener system 100 with the wall frame 12 thereon with the sheathing panels 14 shown as transparent, according to the present disclosure. FIG. 15A is a top plan view of the stud straightener system 100 with the wall frame 12 thereon with the sheathing panels 14 removed, according to the present disclosure. FIG. 15B is a top plan view of the stud straightener system 100 with the wall frame 12 thereon with the sheathing panels 14 shown as transparent, according to the present disclosure. In the embodiment of FIGS. 14A-14B and 15A-15B, the wall structure 10 is sixteen feet (16 ft.) long and contains thirteen studs 16. This length of the wall structure 10 requires four sheathing panels 14 (e.g., each sheathing panel 14 is four feet wide), which creates three seams 17. A seam 17 is a stud 16 at which two sheathing panels 14 are overlayed such that the two sheathing panels 14 are coupled to the seam 17. In this way, the wall structure 10 can include one or more seams 17. In FIGS. 14A and 14B, the studs 16 are bowed or arced to the right. In FIGS. 15A and 15B, the studs 16 are bowed or arced to the left.

The studs 16 at a seam 17 require at least twice as many fasteners as the studs 16 that are not at the seams 17 since two of the sheathing panels 14 must be fastened to the same stud 16 at each of the seams 17. Since one stud 16 is shared between two sheathing panels 14 at the seams 17, the fastener target is smaller than studs 16 that are not at the seams 17, so proper stud location is more critical at the seams 17 to ensure the fasteners are installed away from the edges of the stud 16, thereby avoiding delamination of the stud 16. Thus, the stud straightener system 100 operates as detailed above to straighten the studs 16 by applying a load at the center of the stud 16 since the center of the stud 16 is easier to straighten as compared to locations of the studs 16 closer to the top portion or the bottom portion of the wall frame 12.

Figure 16:
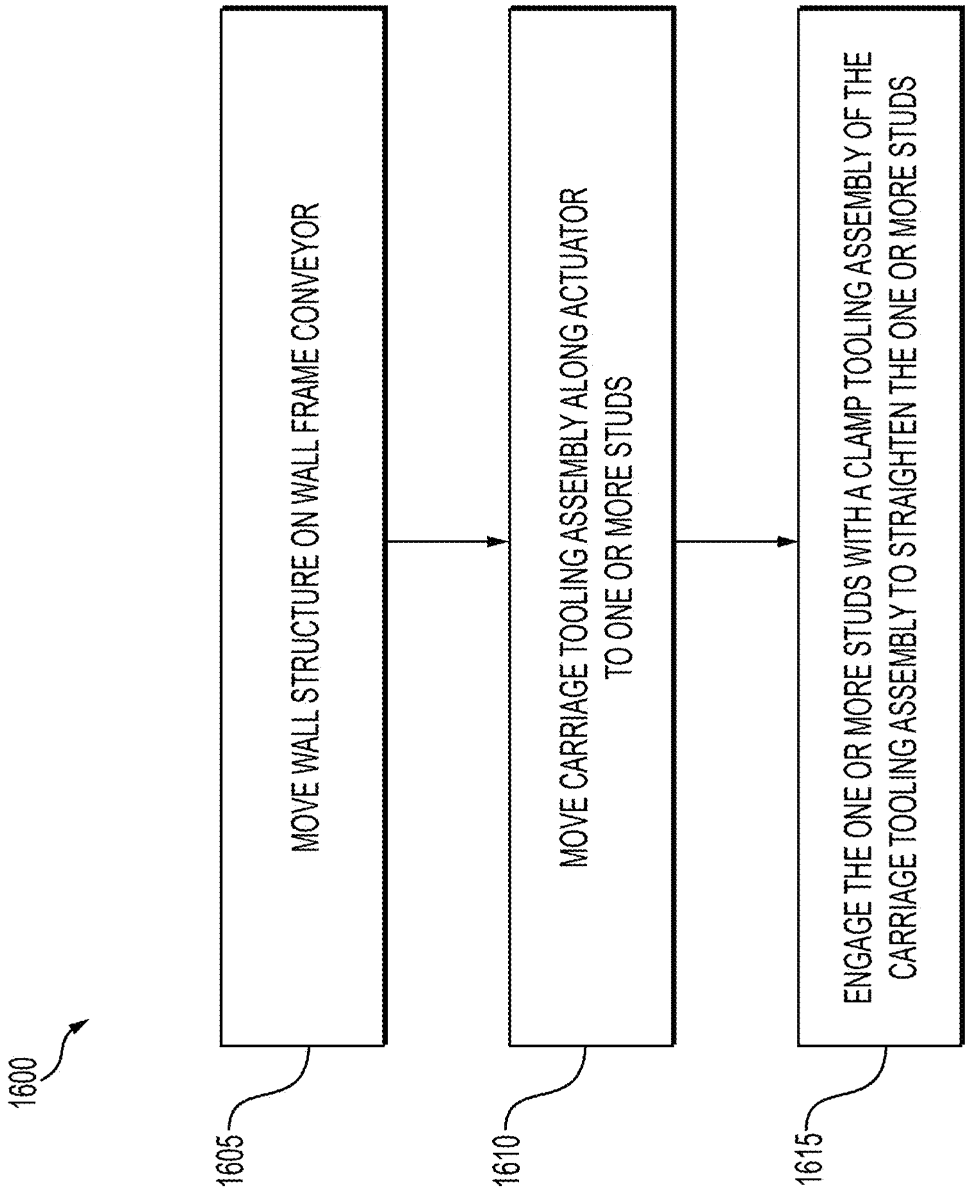
FIG. 16 is a flow diagram of a method of straightening studs of a wall structure for a modular construction unit, according to the present disclosure.

FIG. 16 is a flow diagram of a method 1600 of straightening studs 16 of a wall structure 10 for a modular construction unit, according to the present disclosure. The method 1600 can proceed automatically, for example, by a processor (e.g., of the computing device 1700 of FIG. 17) controlling the stud straightener system 100.

In step 1605, the method 1600 includes moving the wall structure 10 on the wall frame conveyor 110. In step 1610, the method 1600 includes moving the carriage tooling assembly 140 along the actuator 132 to one or more of the studs 16. In step 1615, the method 1600 includes engaging the one or more of the studs 16 with the clamp tooling assembly 180 (e.g., with the clamp 182) to straighten the one or more of the studs 16. The method 1600 can include any of the operations detailed herein with respect to FIGS. 1 to 15B, in any order, and any combinations thereof.

Figure 17:
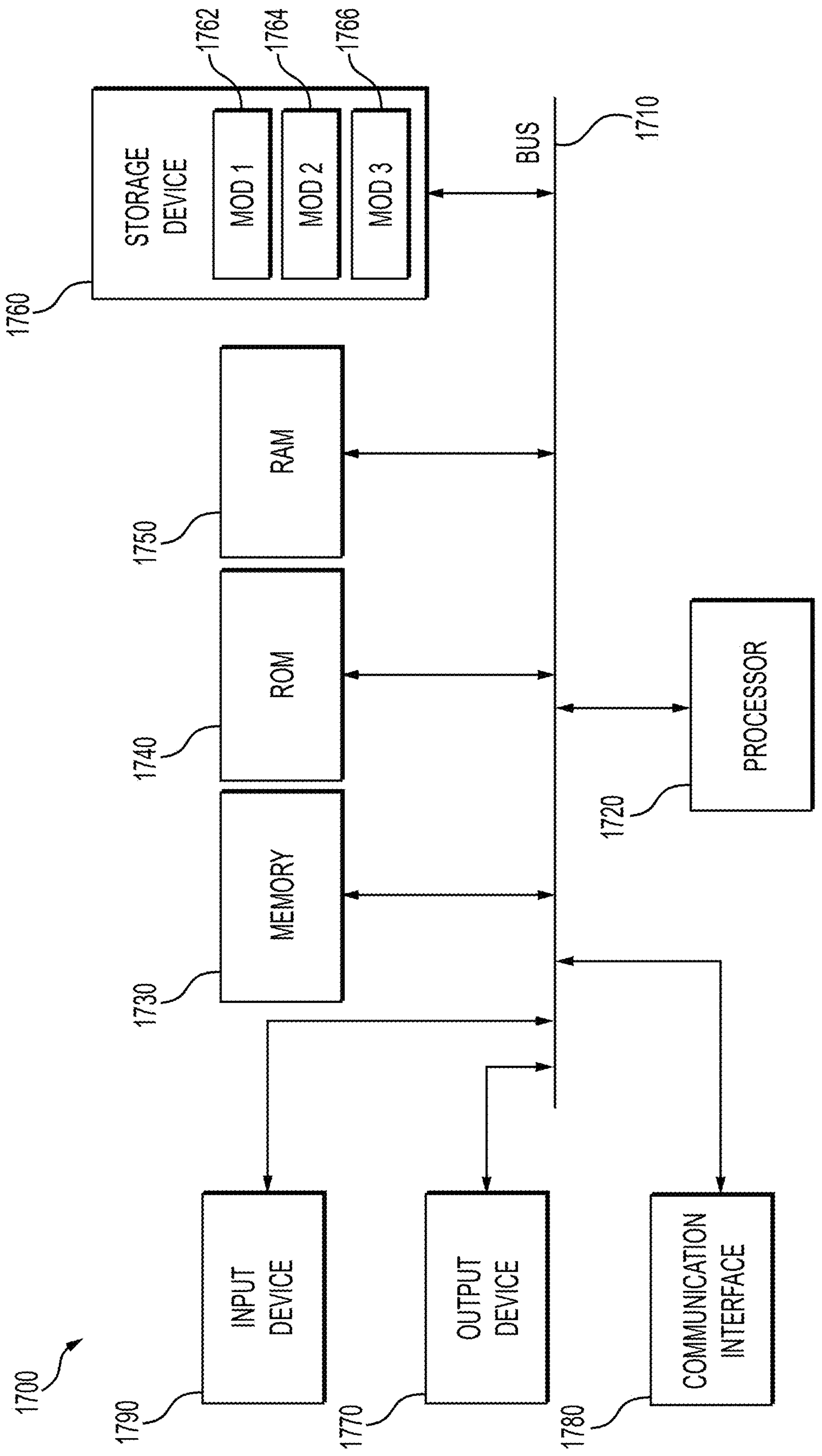
FIG. 17 illustrates a computing device for controlling aspects of the stud straightener system, according to the present disclosure.

FIG. 17 illustrates a computing device 1700 for controlling aspects of the stud straightener system 100, according to the present disclosure. The computing device 1700 can carry out instructions for controlling the components of the stud straightener system 100, such as, for example, the wall frame conveyor 110 and the stud straightener assembly 120. While a single computing device 1700 is illustrated in FIG. 17, the stud straightener system 100 can include any number of computing devices 1700 for controlling the components thereof, and performing the method 1600 of straightening studs 16 of the wall structure 10 for the modular construction unit.

The computing device 1700 includes a processing unit (CPU or processor) 1720 and a system bus 1710 that couples various system components including a memory 1730 such as read-only memory (ROM) 1740 and random-access memory (RAM) 1750 to the processor 1720. The computing device 1700 can include a cache of high-speed memory connected directly with, in close proximity to, or integrated as part of the processor 1720. The computing device 1700 copies data from the memory 1730 and/or the storage device 1760 to the cache for quick access by the processor 1720. In this way, the cache provides a performance boost that avoids processor 1720 delays while waiting for data. These and other modules can control or be configured to control the processor 1720 to perform various actions. Other memory 1730 may be available for use as well. The memory 1730 can include multiple different types of memory with different performance characteristics. It can be appreciated that the disclosure may operate on a computing device 1700 with more than one processor 1720 or on a group or cluster of computing devices networked together to provide greater processing capability. The processor 1720 can include any general-purpose processor and a hardware module or software module, such as module 1 1762, module 2 1764, and module 3 1766 stored in storage device 1760, configured to control the processor 1720 as well as a special-purpose processor where software instructions are incorporated into the actual processor design. The processor 1720 may essentially be a completely self-contained computing system, containing multiple cores or processors, a bus, memory controller, cache, etc. A multi-core processor may be symmetric or asymmetric.

The system bus 1710 may be any of several types of bus structures including a memory bus or memory controller, a peripheral bus, and a local bus using any of a variety of bus architectures. A basic input/output (BIOS) stored in ROM 1740 or the like, may provide the basic routine that helps to transfer information between elements within the computing device 1700, such as during start-up. The computing device 1700 further includes storage devices 1760 such as a hard disk drive, a magnetic disk drive, an optical disk drive, tape drive or the like. The storage device 1760 can include software modules 1762, 1764, 1766 for controlling the processor 1720. Other hardware or software modules are contemplated. The storage device 1760 is connected to the system bus 1710 by a drive interface. The drives and the associated computer-readable storage media provide non-volatile storage of computer-readable instructions, data structures, program modules and other data for the computing device 1700. In one aspect, a hardware module that performs a particular function includes the software component stored in a tangible computer-readable storage medium in connection with the necessary hardware components, such as the processor 1720, system bus 1710, output device 1770, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 1700 is a small, handheld computing device, a desktop computer, or a computer server.

Although the exemplary embodiment described herein employs the storage device 1760, other types of computer-readable media which can store data that are accessible by a computer, such as magnetic cassettes, flash memory cards, digital versatile disks, cartridges, random-access memories (RAMs) 1750, and read-only memory (ROM) 1740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1700, an input device 1790 represents any number of input mechanisms, such as a microphone for speech, a touch-sensitive screen for gesture or graphical input, keyboard, mouse, motion input, speech and so forth. An output device 1770 can also be one or more of a number of output mechanisms known to those of skill in the art, such as, for example, a display. In some instances, multimodal systems enable a user to provide multiple types of input to communicate with the computing device 1700. The communications interface 1780 generally governs and manages the user input and system output. There is no restriction on operating on any particular hardware arrangement and therefore the basic features here may easily be substituted for improved hardware or firmware arrangements as they are developed.

Further aspects of the present disclosure are provided by the subject matter of the following clauses.

A stud straightener system for straightening studs of a wall structure for a modular construction unit, the stud straightener system comprising a wall frame conveyor configured to move the wall structure thereon, the wall structure having a wall frame comprising the studs and one or more sheathing panels on a top side of the wall frame, a stud straightener assembly comprising an actuator assembly having an actuator and a carriage tooling assembly having a clamp tooling assembly, wherein the carriage tooling assembly is configured to move along the actuator to one or more of the studs and the clamp tooling assembly is configured to engage the one or more of the studs to straighten the one or more of the studs.

The stud straightener system of the preceding clause, wherein the wall frame conveyor includes one or more cross-members and a plurality of tracks coupled to the one or more cross-members, the stud straightener assembly is coupled to the one or more cross-members, and the plurality of tracks are configured to move the wall structure thereon.

The stud straightener system of any preceding clause, wherein the actuator assembly includes a servo motor and gearbox that moves the carriage tooling assembly along the actuator to align the clamp tooling assembly with the one or more of the studs.

The stud straightener system of any preceding clause, wherein the stud straightener assembly includes one or more energy chain support plates, an energy chain coupled to the one or more energy chain support plates, and the actuator assembly is coupled to the one or more energy chain support plates, wherein the energy chain supplies power to the carriage tooling assembly.

The stud straightener system of any preceding clause, wherein the carriage tooling assembly includes an energy chain bracket that couples the energy chain to the carriage tooling assembly.

The stud straightener system of any preceding clause, wherein the clamp tooling assembly includes a clamp having a first clamp member and a second clamp member, wherein the first clamp member is configured to move with respect to the second clamp member to close the clamp about the one or more of the studs to straighten the one or more of the studs.

The stud straightener system of any preceding clause, wherein the clamp tooling assembly includes a clamp track, and the first clamp member is movably coupled to the clamp track such that the first clamp member moves along the clamp track to engage the one or more of the studs between the first clamp member and the second clamp member to straighten the one or more of the studs.

The stud straightener system of any preceding clause, wherein the carriage tooling assembly includes a carriage bracket, and the clamp tooling assembly is coupled to the carriage bracket.

The stud straightener system of any preceding clause, wherein the carriage tooling assembly includes a rotary actuator coupled to the carriage bracket and having a rotary shaft coupled to the clamp tooling assembly, the rotary actuator configured to rotate the clamp tooling assembly from a horizontal position to a vertical position at each of the one or more of the studs.

The stud straightener system of any preceding clause, wherein the carriage bracket includes one or more carriage bracket bearings coupled to the carriage bracket, and the rotary shaft is mounted through the one or more carriage bracket bearings such that the one or more carriage bracket bearings support rotation of the rotary shaft.

A method of straightening studs of a wall structure for a modular construction unit, the method comprising: moving the wall structure on a wall frame conveyor, the wall structure having a wall frame comprising the studs and one or more sheathing panels on a top side of the wall frame; moving a carriage tooling assembly of a stud straightener assembly along an actuator to one or more of the studs; engaging the one or more of the studs with a clamp tooling assembly of the carriage tooling assembly to straighten the one or more of the studs.

The method of the preceding clause, wherein the wall frame conveyor includes one or more cross-members and a plurality of tracks coupled to the one or more cross-members, the stud straightener assembly is coupled to the one or more cross-members, and the method further comprises moving the wall structure on the plurality of tracks.

The method of any preceding clause, wherein the stud straightener assembly includes a servo motor and gearbox, and the method further comprises moving, by the servo motor and gearbox, the carriage tooling assembly along the actuator to align the clamp tooling assembly with the one or more of the studs.

The method of any preceding clause, further comprising supplying power to the carriage tooling assembly by an energy chain that is coupled to the carriage tooling assembly.

The method of any preceding clause, further comprising determining a position of the one or more of the studs, and moving the carriage tooling assembly to the position of the one or more of the studs.

The method of any preceding clause, wherein determining the position of the one or more of the studs includes determining the position of the one or more of the studs based on predetermined positions of the studs when the wall frame is stopped on the wall frame conveyor.

The method of any preceding clause, wherein the clamp tooling assembly includes a clamp having a first clamp member and a second clamp member, and the method further comprises moving the first clamp member with respect to the second clamp member to close the clamp about the one or more of the studs to straighten the one or more of the studs.

The method of any preceding clause, wherein the clamp tooling assembly includes a clamp track, and the method further comprises moving the first clamp member along the clamp track to engage the one or more of the studs between the first clamp member and the second clamp member to straighten the one or more the studs.

The method of any preceding clause, wherein the carriage tooling assembly includes a rotary actuator having a rotary shaft coupled to the clamp tooling assembly, and the method further comprises rotating, with the rotary actuator, the clamp tooling assembly from a horizontal position to a vertical position at each of the one or more of the studs.

The method of any preceding clause, further comprising supporting rotation of the rotary shaft by one or more carriage bracket bearings.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A stud straightener system for straightening studs of a wall structure for a modular construction unit, the stud straightener system comprising:

a wall frame conveyor configured to move the wall structure thereon, the wall structure having a wall frame comprising the studs and one or more sheathing panels on a top side of the wall frame;

a stud straightener assembly comprising an actuator assembly having an actuator and a carriage tooling assembly having a clamp tooling assembly and a rotary actuator coupled to the clamp tooling assembly, wherein the carriage tooling assembly is configured to move along the actuator to one or more of the studs, the rotary actuator is configured to rotate the clamp tooling assembly from a horizontal position to a vertical position at each of the one or more of the studs, and the clamp tooling assembly is configured to engage the one or more of the studs to straighten the one or more of the studs.

2. The stud straightener system of claim 1, wherein the wall frame conveyor includes one or more cross-members and a plurality of tracks coupled to the one or more cross-members, the plurality of tracks are configured to move the wall structure thereon.

3. The stud straightener system of claim 2, wherein the stud straightener assembly extends substantially parallel with the plurality of tracks.

4. The stud straightener system of claim 2, wherein the stud straightener assembly is coupled to the one or more cross-members.

5. The stud straightener system of claim 2, wherein the one or more cross-members include a static cross-member and an extendable cross-member, the extendable cross-member being laterally extendable relative to the static cross-member to change a width of the wall frame conveyor.

6. The stud straightener system of claim 1, wherein the actuator assembly includes a servo motor and gearbox that moves the carriage tooling assembly along the actuator to align the clamp tooling assembly with the one or more of the studs.

7. The stud straightener system of claim 1, wherein the stud straightener assembly includes one or more energy chain support plates, an energy chain coupled to the one or more energy chain support plates, and the actuator assembly is coupled to the one or more energy chain support plates, wherein the energy chain supplies power to the carriage tooling assembly.

8. The stud straightener system of claim 7, wherein the carriage tooling assembly includes an energy chain bracket that couples the energy chain to the carriage tooling assembly.

9. The stud straightener system of claim 1, wherein the clamp tooling assembly includes a clamp having a first clamp member and a second clamp member, wherein the first clamp member is configured to move with respect to the second clamp member to close the clamp about the one or more of the studs to straighten the one or more of the studs.

10. The stud straightener system of claim 9, wherein the clamp tooling assembly includes a clamp track, and the first clamp member is movably coupled to the clamp track such that the first clamp member moves along the clamp track to engage the one or more of the studs between the first clamp member and the second clamp member to straighten the one or more of the studs.

11. The stud straightener system of claim 1, wherein the carriage tooling assembly includes a carriage bracket, and the clamp tooling assembly is coupled to the carriage bracket.

12. The stud straightener system of claim 11, wherein the rotary actuator is coupled to the carriage bracket and has a rotary shaft coupled to the clamp tooling assembly, the rotary actuator configured to rotate the rotary shaft to rotate the clamp tooling assembly from the horizontal position to the vertical position at each of the one or more of the studs.

13. The stud straightener system of claim 12, wherein the carriage bracket includes one or more carriage bracket bearings coupled to the carriage bracket, and the rotary shaft is mounted through the one or more carriage bracket bearings such that the one or more carriage bracket bearings support rotation of the rotary shaft.

14. The stud straightener system of claim 12, wherein the rotary shaft includes a rotary actuator coupling for rotatably coupling the rotary shaft to the rotary actuator.

15. The stud straightener system of claim 14, wherein the rotary actuator includes a rotary actuator housing and an output shaft, the rotary shaft coupling being coupled to the output shaft.

16. The stud straightener system of claim 12, wherein the clamp tooling assembly includes a clamp collar, the rotary shaft inserted through the clamp collar and coupling within the clamp tooling assembly.

17. The stud straightener system of claim 1, wherein the actuator assembly includes a carriage plate that is configured to move along the actuator, the carriage tooling assembly coupled to the carriage plate.

18. A stud straightener system for straightening studs of a wall structure for a modular construction unit, the stud straightener system comprising:

a wall frame conveyor configured to move the wall structure thereon, the wall structure having a wall frame comprising the studs and one or more sheathing panels on a top side of the wall frame;

a stud straightener assembly comprising an actuator assembly having an actuator and a carriage tooling assembly having a clamp tooling assembly and a rotary actuator coupled to the clamp tooling assembly, wherein the carriage tooling assembly is configured to move along the actuator to one or more of the studs, the rotary actuator is configured to rotate the clamp tooling assembly from a horizontal position to a vertical position at each of the one or more of the studs, and the clamp tooling assembly is configured to engage the one or more of the studs to straighten the one or more of the studs, wherein the actuator assembly includes a servo motor and gearbox that moves the carriage tooling assembly along the actuator to align the clamp tooling assembly with the one or more of the studs, and wherein the clamp tooling assembly includes a clamp having a first clamp member and a second clamp member, wherein the first clamp member is configured to move with respect to the second clamp member to close the clamp about the one or more of the studs to straighten the one or more of the studs.

19. The stud straightener system of claim 18, wherein the wall frame conveyor includes one or more cross-members and a plurality of tracks coupled to the one or more cross-members, the plurality of tracks are configured to move the wall structure thereon.

20. The stud straightener system of claim 18, wherein the stud straightener assembly includes one or more energy chain support plates, an energy chain coupled to the one or more energy chain support plates, and the actuator assembly is coupled to the one or more energy chain support plates, wherein the energy chain supplies power to the carriage tooling assembly.

* * * * *